US009519289B2

(12) United States Patent
Munich et al.

(10) Patent No.: US 9,519,289 B2
(45) Date of Patent: Dec. 13, 2016

(54) SYSTEMS AND METHODS FOR PERFORMING SIMULTANEOUS LOCALIZATION AND MAPPING USING MACHINE VISION SYSTEMS

(71) Applicant: iRobot Corporation, Bedford, MA (US)

(72) Inventors: Mario Munich, La Canada, CA (US); Nikolai Romanov, Oak Park, CA (US); Dhiraj Goel, Pasadena, CA (US); Philip Fong, South Pasadena, CA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 14/856,526

(22) Filed: Sep. 16, 2015

(65) Prior Publication Data
US 2016/0147230 A1     May 26, 2016

Related U.S. Application Data

(60) Provisional application No. 62/085,025, filed on Nov. 26, 2014, provisional application No. 62/116,307, filed on Feb. 13, 2015.

(51) Int. Cl.
*B25J 9/16* (2006.01)
*G05D 1/02* (2006.01)
(Continued)

(52) U.S. Cl.
CPC ........... *G05D 1/0246* (2013.01); *G01C 21/206* (2013.01); *G05D 1/0088* (2013.01); *Y10S 901/01* (2013.01)

(58) Field of Classification Search
CPC ...... B25J 9/1694; Y10S 901/09; G05D 1/0246
See application file for complete search history.

(56) References Cited

U.S. PATENT DOCUMENTS

| 5,696,675 A | 12/1997 | Nakamura et al. |
| 6,301,524 B1 | 10/2001 | Takenaka |

(Continued)

FOREIGN PATENT DOCUMENTS

| GB | 2404330 A | 2/2005 |
| JP | H 0816241 A | 1/1996 |

(Continued)

OTHER PUBLICATIONS

"Facts on the Trilobite," Electrolux, accessed online <http://trilobite.electrolux.se/presskit_en/node1335.asp?print=yes&pressID=> Dec. 12, 2003, 2 pages.

(Continued)

*Primary Examiner* — Thomas Tarcza
*Assistant Examiner* — Alex C Dunn
(74) *Attorney, Agent, or Firm* — Myers Bigel, P.A.

(57) ABSTRACT

The present invention provides a mobile robot configured to navigate an operating environment, that includes a controller circuit that directs a drive of the mobile robot to navigate the mobile robot through an environment using camera-based navigation system and a camera including optics defining a camera field of view and a camera optical axis, where the camera is positioned within the recessed structure and is tilted so that the camera optical axis is aligned at an acute angle of above a horizontal plane in line with the top surface and is aimed in a forward drive direction of the robot body, and the camera is configured to capture images of the operating environment of the mobile robot.

20 Claims, 24 Drawing Sheets

(51) Int. Cl.
*G01C 21/20* (2006.01)
*G05D 1/00* (2006.01)

(56) References Cited

U.S. PATENT DOCUMENTS

| | | | |
|---|---|---|---|
| 6,389,329 B1 | 5/2002 | Colens | |
| 6,496,754 B2 | 12/2002 | Song et al. | |
| 6,532,404 B2 | 3/2003 | Colens | |
| 6,594,844 B2 | 7/2003 | Jones | |
| 6,611,120 B2 | 8/2003 | Song et al. | |
| 6,690,134 B1 | 2/2004 | Jones et al. | |
| 6,732,826 B2 | 5/2004 | Song et al. | |
| 6,781,338 B2 | 8/2004 | Jones et al. | |
| 6,809,490 B2 | 10/2004 | Jones et al. | |
| 6,957,712 B2 | 10/2005 | Song et al. | |
| 6,965,209 B2 | 11/2005 | Jones et al. | |
| 7,155,308 B2 | 12/2006 | Jones | |
| 7,171,285 B2 | 1/2007 | Kim et al. | |
| 7,173,391 B2 | 2/2007 | Jones et al. | |
| 7,196,487 B2 | 3/2007 | Jones et al. | |
| 7,388,343 B2 | 6/2008 | Jones et al. | |
| 7,389,156 B2 | 6/2008 | Ziegler et al. | |
| 7,448,113 B2 | 11/2008 | Jones et al. | |
| 7,571,511 B2 | 8/2009 | Jones et al. | |
| 7,636,982 B2 | 12/2009 | Jones et al. | |
| 7,761,954 B2 | 7/2010 | Ziegler | |
| 7,774,158 B2 | 8/2010 | Goncalves et al. | |
| 8,086,419 B2 | 12/2011 | Goncalves et al. | |
| 8,095,336 B2 | 1/2012 | Goncalves et al. | |
| 8,150,650 B2 | 4/2012 | Goncalves et al. | |
| 9,026,302 B2 | 5/2015 | Stout et al. | |
| 9,188,983 B2 | 11/2015 | Stout et al. | |
| 2002/0016649 A1 | 2/2002 | Jones | |
| 2002/0120364 A1 | 8/2002 | Colens | |
| 2003/0007023 A1 | 1/2003 | Barclay et al. | |
| 2003/0025472 A1 | 2/2003 | Jones et al. | |
| 2004/0016077 A1 | 1/2004 | Song et al. | |
| 2004/0020000 A1 | 2/2004 | Jones | |
| 2004/0049877 A1 | 3/2004 | Jones et al. | |
| 2004/0158357 A1 | 8/2004 | Lee et al. | |
| 2004/0187457 A1 | 9/2004 | Colens | |
| 2004/0207355 A1 | 10/2004 | Jones et al. | |
| 2005/0067994 A1 | 3/2005 | Jones et al. | |
| 2005/0168720 A1* | 8/2005 | Yamashita | G01S 17/42 356/4.01 |
| 2005/0192707 A1 | 9/2005 | Park et al. | |
| 2005/0204717 A1 | 9/2005 | Colens | |
| 2006/0056677 A1 | 3/2006 | Tani | |
| 2006/0061657 A1 | 3/2006 | Rew et al. | |
| 2007/0266508 A1 | 11/2007 | Jones et al. | |
| 2008/0140255 A1 | 6/2008 | Ziegler et al. | |
| 2008/0155768 A1 | 7/2008 | Ziegler et al. | |
| 2008/0211815 A1 | 9/2008 | Gordon | |
| 2008/0307590 A1 | 12/2008 | Jones et al. | |
| 2010/0049365 A1 | 2/2010 | Jones et al. | |
| 2010/0257690 A1 | 10/2010 | Jones et al. | |
| 2010/0257691 A1 | 10/2010 | Jones et al. | |
| 2010/0263158 A1 | 10/2010 | Jones et al. | |
| 2012/0038549 A1 | 2/2012 | Mandella et al. | |
| 2012/0121161 A1 | 5/2012 | Eade et al. | |
| 2013/0226344 A1* | 8/2013 | Wong | G05D 1/024 700/258 |
| 2013/0331987 A1 | 12/2013 | Karlsson et al. | |
| 2014/0028805 A1* | 1/2014 | Tohme | G01C 15/002 348/47 |
| 2014/0233935 A1 | 8/2014 | Wada et al. | |
| 2014/0244038 A1 | 8/2014 | Karlsson et al. | |
| 2015/0049004 A1* | 2/2015 | Deering | G02B 27/0172 345/8 |
| 2015/0219437 A1* | 8/2015 | Dowski | G05D 1/02 701/1 |
| 2016/0101523 A1 | 4/2016 | Stout et al. | |

FOREIGN PATENT DOCUMENTS

| | | |
|---|---|---|
| JP | 2002085305 A | 3/2002 |
| JP | 2004033340 A | 2/2004 |
| JP | 2005230044 A | 9/2005 |
| JP | 2005352707 A | 12/2005 |
| JP | 2007209392 A | 8/2007 |

OTHER PUBLICATIONS

"Welcome to the Electrolux Trilobite," Electrolux, accessed online <http://electroluxusa.com/node57.asp?currentURL=node142. asp%3F> Mar. 18, 2005, 2 pages.

Aly, Mohammed, et al., CompactKdt: Compact Signatures for Accurate Large Scale Object Recognition, IEEE Workshop on Applications of Computer Vision (WACV), Colorado, Jan. 2012, pp. 505-512.

Andersen et al., "Landmark based navigation strategies," SPIE Conference on Mobile Robots XIII, SPIE vol. 3525, pp. 170-181, Jan. 8, 1999.

Doty, K. L., and Harrison, R. R., Sweep Strategies for a Sensory-Driven, Behavior-Based Vacuum Cleaning Agent, AAAI 1993 Fall Symposium Series, Instantiating Real-World Agents, Research Triangle Park, Raleigh, NC, Oct. 22-24, 1993, pp. 1-6.

Facchinetti Claudio et al., "Self-Positioning Robot Navigation Using Ceiling Images Sequences," ACCV '95, 5 pages, Dec. 1995.

Fukuda et al. "Navigation System based on Ceiling Landmark Recognition for Autonomous mobile robot,", Proceedings of the IECON 93, International Conference on Industrial Electronics, Control, and Instrumentation, 1993, Nov. 15-19, 1993, vol. 3, pp. 1466-1471, Maui, HI.

Fukuda et al. "Construction mechanism of group behavior with cooperation", 1995 IEEE/RSJ International Conference on Intelligent Robots and Systems 95. 'Human Robot Interaction and Cooperative Robots', Aug. 5-9, 1995, vol. 3, pp. 535-542, Pittsburgh, PA.

Goel, Dhiraj, et al., "Systematic Floor Coverage of Unknown Environments Using Rectangular Regions and Localization Certainty", 2013 IEEE/RSJ International Conference on Intelligent Robots and Systems (IROS 2013), Tokyo, Japan, Nov. 3-7, 2013, pp. 1-8.

Goncalves, Luis, et al., A Visual Front-end for Simultaneous Localization and Mapping, Proceedings of the 2005 IEEE International Conference on Robotics and Automation, Barcelona, Spain, Apr. 2005, pp. 44-49.

Gutmann, Jens-Steffen, et al., A Constant-Time Algorithm for Vector Field SLAM Using an Exactly Sparse Extended Information Filter, IEEE Transactions on Robotics (Volume:28 , Issue: 3 ), Jan. 2, 2012, pp. 650-667.

Gutmann, Jens-Steffen, et al., Challenges of designing a low-cost indoor localization system using active beacons, Technologies for Practical Robot Applications (TePRA), 2013 IEEE International Conference on, Apr. 22-23, 2013, pp. 1-6.

Gutmann, Jens-Steffen, et al., Localization in a vector field map, 2012 IEEE/RSJ International Conference on Intelligent Robots and Systems, pp. 3144-3151.

Gutmann, Jens-Steffen, et al., The Social Impact of a Systematic Floor Cleaner, Advanced Robotics and its Social Impacts (ARSO), 2012 IEEE Workshop on, 2012, pp. 50-53.

Gutmann, Jens-Steffen, et al., Vector Field Slam, IEEE Transactions on Robotics, 2012, pp. 650-667.

Hitachi: News release: The home cleaning robot of the autonomous movement type (experimental machine) is developed. May 29, 2003. Accessed online Mar. 18, 2005 <http://www.i4u.com/japanreleases/hitachirobot.htm> 5 pages.

Hom-Bot Owner's Manual, LG, Apr. 11, 2013, 38 pages.

Honda Motor Co., Ltd., English Translation of JP11212642, Aug. 6, 1999, 31 pages.

Jeong, WooYeon et al., CV-SLAM: A new Ceiling Vision-based SLAM technique, 2005 IEEE/RSJ International Conference on Intelligent Robots and Systems, Aug. 2-6, 2005, pp. 3195-3200.

(56) References Cited

OTHER PUBLICATIONS

Karcher RC 3000 Robotic Cleaner, Product page, accessed online <http://www.karcher-usa.com/showproducts.php?op=view_prod&param1=143&param2=&param3=> Mar. 18, 2005, 3 pages.
Karcher RoboCleaner RC 3000, Dec. 12, 2003, 4 pages.
Karcher, Product Manual Download, 2003, 16 pages.
Karlsson et al, "Core Technologies for service Robotics," IEEEIRSJ International Conference on Intelligent Robots and Systems (IROS 2004), vol. 3, pp. 2979-2984, Sep. 2004.
Karlsson et al., The vSLAM Algorithm for Robust Localization and Mapping, Proceedings of the 2005 IEEE International Conference on Robotics and Automation, Barcelona, Spain, pp. 24-29, Apr. 2005.
Karlsson, Niklas et al., The vSLAM Algorithm for Navigation in Natural Environments, Korean Robotics Society Review, vol. 2, No. 1, pp. 51-67, 2005.
Knights, et al., "Localization and Identification of Visual Landmarks," Journal o/Computing Sciences in Colleges, 16(4):312-313, May 2001.
Lang et al., "Visual Measurement of Orientation Using Ceiling Features", IMTC 1994 IEEE, pp. 552-555, May 10-12, 1994.
Maschinemarkt Wurzburg 105, No. 27, pp. 3, 30, Jul. 5, 1999 (with English Translation).
Miro et al., "Towards Vision Based Navigation in Large Indoor Environments," 2006 Proceedings of the IEEE/RSJ, International Conferences on Intelligent Robots and Systems, Oct. 9-15, 2006, Beijing, China.
Munich, M. E., et al., SIFT-ing Through Features with ViPR, IEEE Robotics & Automation Magazine, Sep. 2006, pp. 72-77.
Munich, M.E., et al., Application of Visual Pattern Recognition to Robotics and Automation. IEEE Robotics & Automation Magazine, pp. 72-77, 2006.
Prassler, et al., English Translation of DE19849978, Feb. 8, 2001, 16 pages.
Roboking Owner's Manual, LG, Apr. 11, 2013, 36 pages.
Sim et al, "Learning Visual Landmarks for Pose Estimation," IEEE International Conference on Robotics and Automation, vol. 3, Detroit, MI, pp. 1972-1978, May 1999.
Stevens, Tim, Samsung's Tango robot vacuum uses cameras to clean your floors, duvet covers, engadget [online] <http://www.engadget.com/2009/11/05/samsungs-tango-robotvacuum-uses-cameras-to-clean-your-floors/> Nov. 5, 2009.
Yamamoto, Yutaka, et al., Optical Sensing for Robot Perception and Localization, IEEE Workshop on Advanced Robotics and its Social Impacts, 2005, Jun. 12-15, 2005, pp. 14-17.
International Search Report and Written Opinion for PCT/US15/61153 dated Mar. 16, 2016.

\* cited by examiner

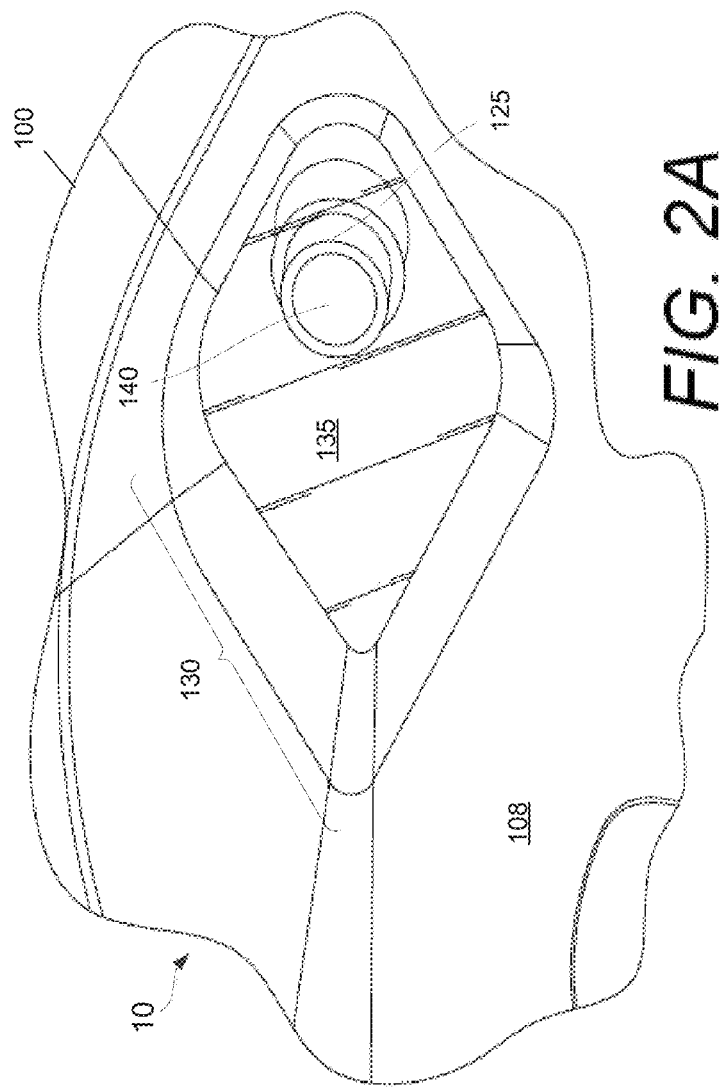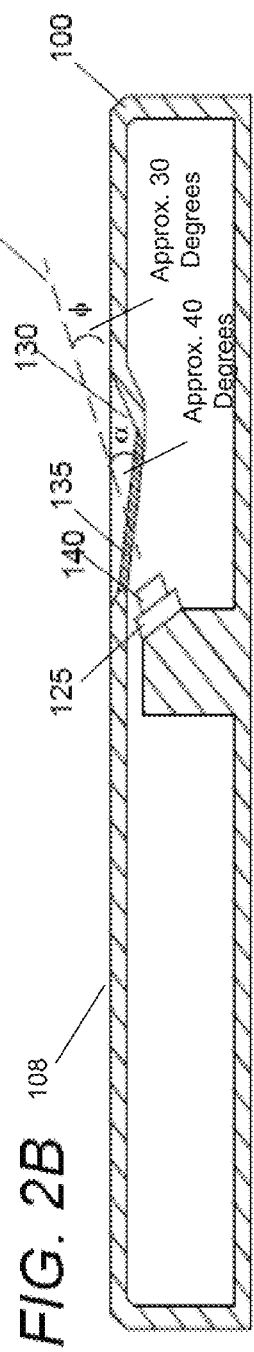

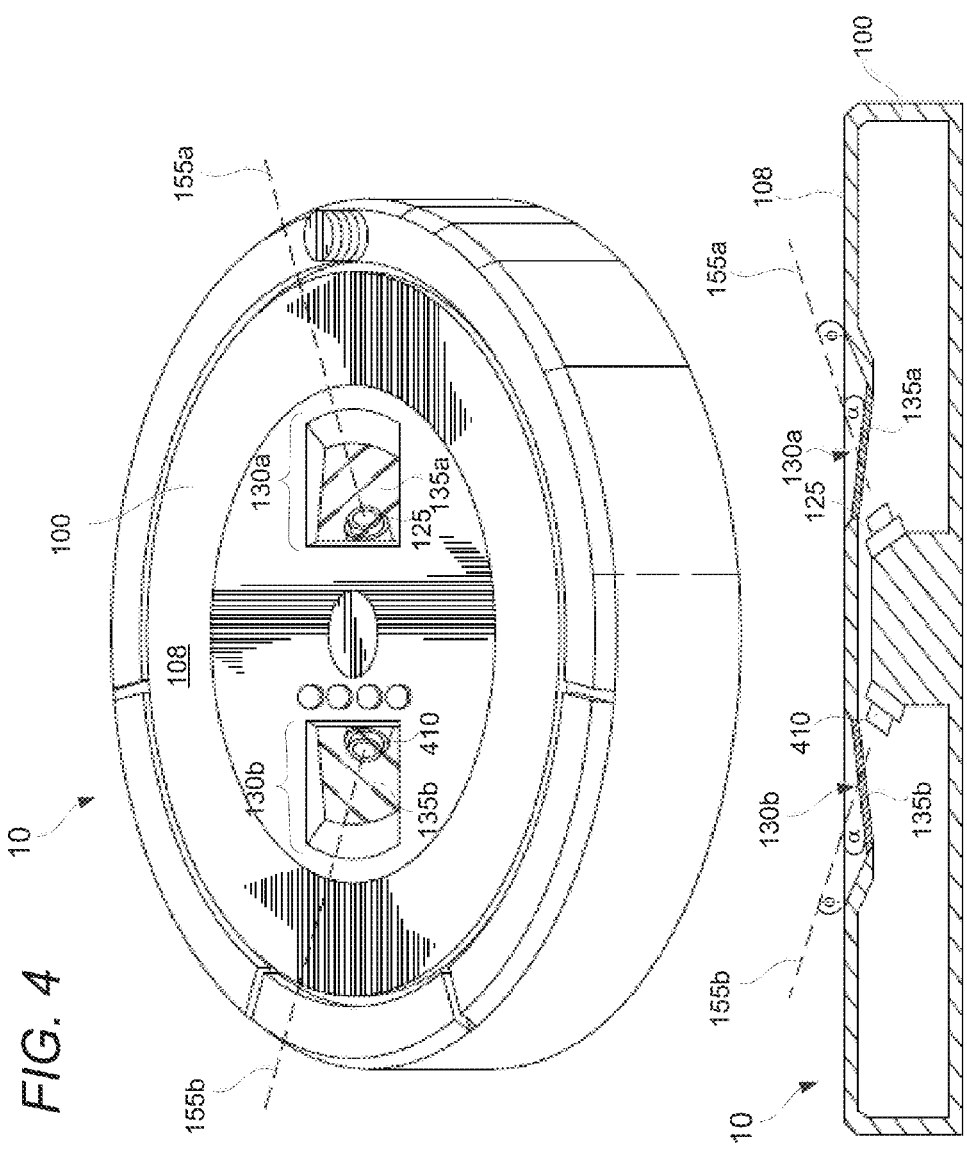

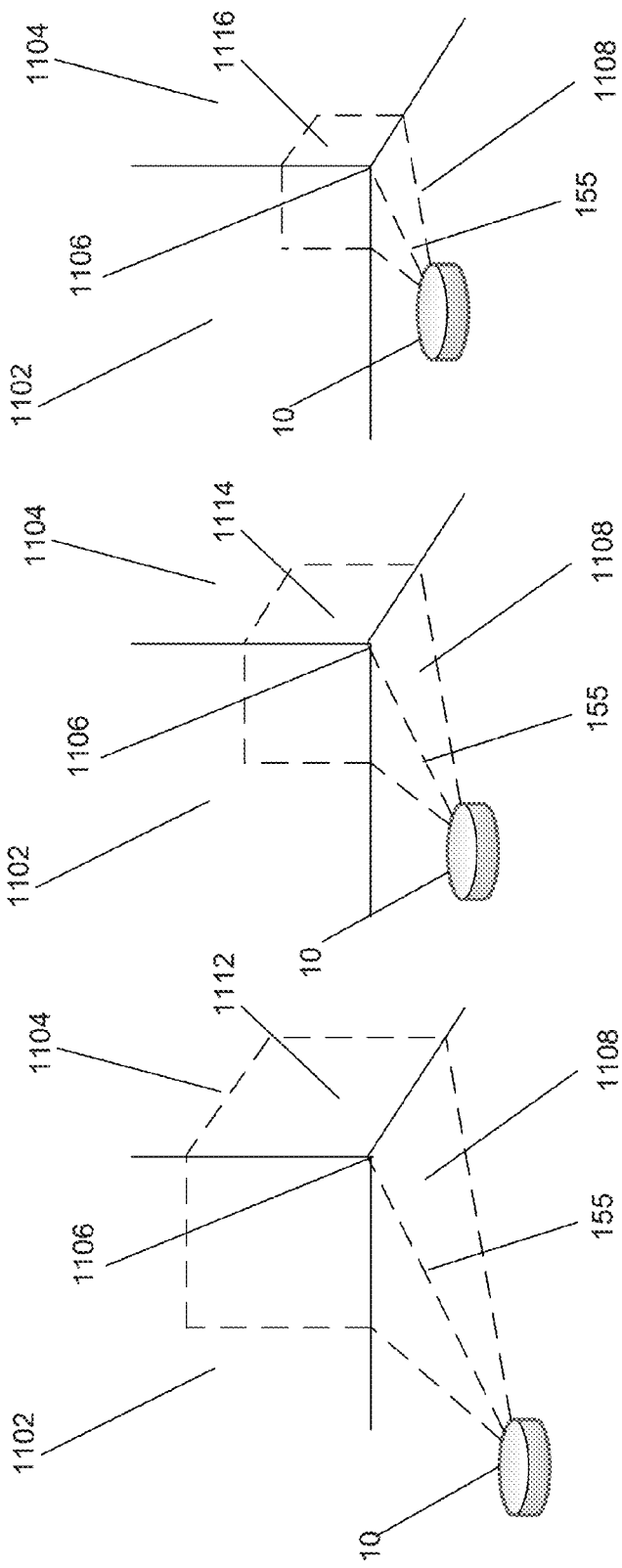

SYSTEMS AND METHODS FOR PERFORMING SIMULTANEOUS LOCALIZATION AND MAPPING USING MACHINE VISION SYSTEMS

RELATED APPLICATIONS

The present application claims the benefit of and priority from U.S. Provisional Patent Application No. 62/085,025, filed on Nov. 26, 2014, entitled "Systems and Methods for Performing Simultaneous Localization and Mapping using Machine Vision Systems" and from U.S. Provisional Patent Application No. 62/116,307 filed on Feb. 13, 2015, entitled "Systems and Methods for Performing Simultaneous Localization and Mapping using Machine Vision Systems", the disclosures of which are incorporated herein by reference in their entirety.

TECHNICAL FIELD

Systems and methods for capturing images used to obtain visual measurements for use in simultaneous location and mapping are described herein.

BACKGROUND

Many robots are electro-mechanical machines, which are controlled by a computer. Mobile robots have the capability to move around in their environment and are not fixed to one physical location. An example of a mobile robot that is in common use today is an automated guided vehicle or automatic guided vehicle (AGV). An AGV is typically considered to be a mobile robot that follows markers or wires in the floor, or uses a vision system or lasers for navigation. Mobile robots can be found in industry, military and security environments. They also appear as consumer products, for entertainment or to perform specific tasks such as vacuum cleaning and home assistance.

In order to achieve full autonomy, a mobile robot typically needs to possess the ability to explore its environment without user-intervention, build a reliable map of the environment, and localize itself within the map. Significant research has been conducted in the area of Simultaneous Localization and Mapping (SLAM) to address this problem in mobile robotics. The development of better navigation algorithms and more accurate sensors have enabled significant progress towards building better robots.

SUMMARY OF THE INVENTION

The present invention provides a mobile robot configured to navigate an operating environment, that includes: a body having a top surface; a drive mounted to the body; a recessed structure beneath the plane of the top surface near a geometric center of the body; a controller circuit in communication with the drive, wherein the controller circuit directs the drive to navigate the mobile robot through an environment using camera-based navigation system; and a camera including optics defining a camera field of view and a camera optical axis, wherein: the camera is positioned within the recessed structure and is tilted so that the camera optical axis is aligned at an acute angle of 30-40 degrees above a horizontal plane in line with the top surface and is aimed in a forward drive direction of the robot body, the field of view of the camera spans a frustum of 45-65 degrees in the vertical direction, and the camera is configured to capture images of the operating environment of the mobile robot.

In several embodiments, the camera is protected by a lens cover aligned at an acute angle with respect to the optical axis of the camera.

In certain embodiments, the lens cover is set back relative to an opening of the recessed structure and an acute angle with respect to the optical axis of the camera that is closer to perpendicular than an angle formed between a plane defined by the top surface and the optical axis of the camera.

In several embodiments, the acute angle is between 15 and 70 degrees.

In some embodiments, the angle formed between a plane defined by the opening in the recessed structure and the optical axis of the camera ranges between 10 and 60 degrees.

In some embodiments, the camera field of view is aimed at static features located in a range of 3 feet to 8 feet from a floor surface at a distance of 3 feet to 10 feet from the static features.

In some embodiments, the camera images contain about 6-12 pixels per inch and features at the top of the image move upward between successive images more quickly than the speed at which the mobile robot moves and features at the bottom of the image move downward between successive images more slowly than the speed at which the mobile robot moves and wherein the controller is configured to determine the speed of the mobile robot and location of features in the image in identifying disparity between successive images.

In certain embodiments, the mobile robot moves at a velocity of 220 mm per second to 450 mm per second and features lower than 45 degrees relative to the horizon will track slower than approximately 306 mm per second and features higher than 45 degrees will track faster than 306 mm per second.

In some embodiments, the optics define an f number that is between 1.8 and 2.0

In several embodiments, the optics define a focal length that is at least 40 cm.

In some embodiments, the body further includes: a memory in communication with the controller circuit; and an odometry sensor system in communication with the drive, wherein the memory further contains a visual measurement application, a simultaneous location and mapping (SLAM) application, a landmarks database, and a map of landmarks, wherein the controller circuit directs a processor to: actuate the drive and capture odometry data using the odometry sensor system; acquire a visual measurement by providing at least the captured odometry information and the captured image to the visual measurement application; determine an updated robot pose within an updated map of landmarks by providing at least the odometry information, and the visual measurement as inputs to the SLAM application: and determine robot behavior based upon inputs including the updated robot pose within the updated map of landmarks.

In some embodiments, the landmarks database includes: descriptions of a plurality of landmarks; a landmark image of each of the plurality of landmarks and an associated landmark pose from which the landmark image was captured; and descriptions of a plurality of features associated with a given landmark from the plurality of landmarks including a 3D position for each of the plurality of features associated with the given landmark.

In certain embodiments, the visual measurement application directs the processor to: identify features within an input image; identify a landmark from the landmark database in the input image based upon the similarity of the features identified in the input image to matching features associated with a landmark image of the identified landmark in the landmark database: and estimate a most likely relative pose by determining a rigid transformation of the 3D structure of the matching features associated with the identified landmark that results in the highest degree of similarity with the identified features in the input image, where the rigid transformation is determined based upon an estimate of relative pose and the acute angle at which the optical axis of the camera is aligned above the direction of motion of the mobile robot.

In some embodiments, identifying a landmark in the input image includes comparing unrectified image patches from the input image to landmark images within the landmark database.

In several embodiments, the SLAM application directs the processor to: estimate the location of the mobile robot within the map of landmarks based upon a previous location estimate, odometry data and at least one visual measurement; and update the map of landmarks based upon the estimated location of the mobile robot, the odometry data, and the at least one visual measurement.

In some embodiments, the controller circuit further directs a processor to actuate the drive to translate the mobile robot toward a landmark identified in a previous input frame; and the visual measurement application further directs a processor to search for features of the landmark identified in the previous input image in locations above the locations in which the features were identified in the previous input image.

In some embodiments, the visual measurement application further directs the processor to generate new landmarks by: detecting features within images in a sequence of images; identifying a set of features forming a landmark in multiple images from the sequence of images; estimating 3D structure of the set of features forming a landmark and relative robot poses at the times each of the multiple images is captured using the identified set of features forming the landmark in each of the multiple images; recording a new landmark in the landmark database, where recording the new landmark comprises storing: an image of the new landmark, at least the set of features forming the new landmark, and the 3D structure of the set of features forming the new landmark; and notify the SLAM application of the creation of a new landmark.

In several embodiments, the SLAM application directs a processor to: determine a landmark pose as the pose of the mobile robot at the time the image of the new landmark stored in the landmark database is captured; and recording the landmark pose for the new landmark in the landmark database.

In some embodiments, the visual measurement application further directs a processor to estimate 3D structure of the set of features forming the landmark and relative robot poses at the times each of the multiple images is captured by minimizing reprojection error of the 3D structure of the set of features forming the landmark onto each of the multiple images for the estimated relative robot poses at the times each of the multiple images is captured.

In some embodiments, the visual measurement application further directs a processor to identify at least one landmark in multiple images from the sequence of images by comparing unrectified image patches from the images in the sequence of images.

In some embodiments, the at least one processor is a single processor directed by the visual measurement application, behavioral controller application, and SLAM application.

In a number of embodiments, the at least one processor includes at least two processors where the behavioral controller application directs a first of the at least two processors and the virtual measurement application and SLAM application direct another of the at least two processors.

In some embodiments, the machine vision sensor system further includes a plurality of cameras under the top surface of the robot and having focal axes angled upward relative to the horizontal plane of the top surface and wherein at least one camera faces a reverse drive direction opposite to the forward drive direction.

In some embodiments, the machine vision sensor system includes a second camera including optics defining a camera field of view and a camera optical axis; and the second camera is positioned so that the optical axis of the optics of the second camera is aligned at an angle above the direction of motion.

In several embodiments, the machine vision system includes a stereo pair of cameras having overlapping fields of view.

In several embodiments, the camera is positioned within the recessed structure at a distance of at most 6 inches from a floor surface.

In some embodiments, the camera field of view is aimed at static features located in a range of 3 feet to 8 feet from a floor surface on a planar wall.

In several embodiments, the camera images contain about 6-12 pixels per inch.

In certain embodiments, the camera is a 320×420 VGA, 3 megapixel camera that does not have an IR filter.

Some embodiments of the invention provide a mobile robot configured to navigate an operating environment, including: a body that includes a top surface located at a height not more than 6 inches from a bottom surface, the body including a recessed structure under the top surface, the body containing: at least one processor; memory containing a behavioral controller application, where the behavioral controller application directs a processor to navigate an environment based on the captured images; a machine vision sensor system including a camera configured to capture images of the operating environment of the mobile robot, the camera including optics defining a camera field of view and a camera optical axis, where the camera is positioned within the recessed structure and is tilted so that the optical axis is aligned at an acute angle between 10 and 60 degrees above a forward drive direction of motion of the mobile robot.

In some embodiments, the body further includes: a lens cover protecting the camera, wherein the lens cover is set back relative to an opening of the recessed structure at an acute angle with respect to the optical axis of the camera that is closer to perpendicular than an angle formed between a plane defined by the opening in the recessed structure and the optical axis of the camera.

In some embodiments, the camera is a 320×420 VGA, 3 megapixel camera that does not have an IR filter.

BRIEF DESCRIPTION OF THE DRAWINGS

FIG. 2A illustrates a top perspective view of a mobile robot that includes a tilted camera within a recessed structure.

FIG. 2B illustrates a cross-sectional view of a tilted camera of a mobile robot.

FIG. 4 illustrates a mobile robot configured with forward and backward facing tilted cameras contained within separate recesses within the top of the body of the mobile robot and protected using lens covers.

FIG. 5 illustrates a cross-sectional view of the front and rear facing tilted cameras of a mobile robot configured in the manner illustrated in FIG. 4.

FIGS. 11A-11C illustrate examples of a field of view captured by a mobile robot that has a camera configured such that the optical axis is aligned with the forward direction of motion of the mobile robot.

DETAILED DESCRIPTION

Figure 1A:
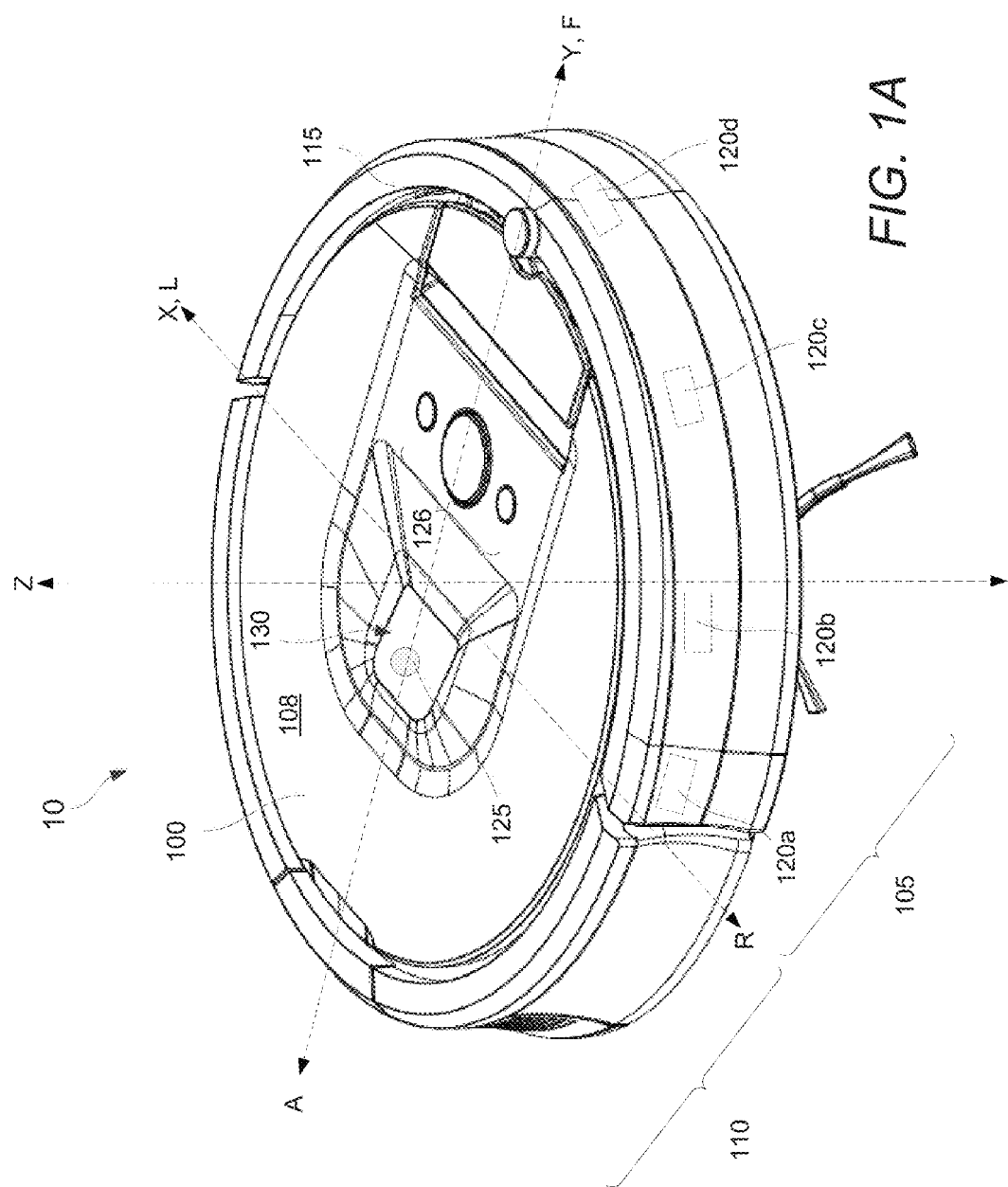
FIG. 1A illustrates s front perspective view of the mobile robot.

Turning now to the drawings, particularly the FIGS. 1A-1C, 4 and 5, systems and methods for performing Visual Simultaneous Localization and Mapping (VSLAM) using mobile robot 10 machine vision systems including one or more tilted cameras 125 are illustrated. In implementations, the one or more tilted cameras 125 are recessed within a central portion of the body 100 of the mobile robot 10 at a fixed angle relative to the top surface 108 of the robot and each of the one or more tilted cameras 125 are protected by a lens cover 135 aligned at an acute angle with respect to the optical axis 155 of the camera. Where a camera 125 is recessed in a portion of the body 100 of the mobile robot 10, the lens cover 135 may also be set back relative to the opening of the recess 130. In implementations, the navigation system 120 is part of a mobile robot 10 that is a house cleaning robot no taller than 4 inches from a floor surface to the top surface 108 of the robot. In this way, the house cleaning robot 10 can navigate into tight spaces (e.g., beneath chairs and beneath the face frame of kitchen cabinetry). In several implementations, the mobile robot 10 is 13.9 inches in diameter and weighs 8.4 lbs and moves at a speed of 220 mm per second to 450 mm per second. In a still further optional aspect of the invention, the one or more tilted cameras 125 are tilted so that the house cleaning robot 10 can capture images of reliably static, feature rich objects, such as picture frames hung on the walls of a home and other features having no displacement. As is discussed further below, the mobile robot 10 can use features of reliably static objects located at a particular range of heights above the floor to build a map of an environment and navigate using vision based sensors and vision based simultaneous localization and mapping, or VSLAM.

The combination of SLAM with visual sensors is often referred to as VSLAM 740. VSLAM 740 processes are typically vision and odometry-based, and enable reliable navigation in feature rich environments. Such visual techniques can be used by a vehicle, such as a mobile robot 10, to autonomously navigate an environment using a self-generated map that is continuously updated. A variety of machine vision systems have been proposed for use in VSLAM 740 including machine vision systems that include one or more cameras 125.

Systems and methods in accordance with embodiments of the invention perform VSLAM 740 using a camera 125 mounted under the top surface 108 of a mobile robot 10 and having an optical axis 155 aligned at an acute angle above the top surface 108 of a mobile robot 10. Many VSLAM 740 processes analyze disparity of features captured in a series of images in order to estimate distances to features and/or triangulate position. In general, the amount of disparity observed for a set of features between a series of images that have been captured from different vantage points determines the precision with which these features are mapped within the environment. The greater the observed disparity, the more accurate the distance measurement.

When a mobile robot 10 employs a forward looking camera 125 having an optical axis 155 of the lens 140 aligned parallel with the direction of forward motion, there is generally only a minimal amount of disparity that can be observed in a set of features positioned directly in front of the mobile robot 10 as the robot moves toward the features. As is discussed further below, features visible in the center of the field of view of a forward looking camera are likely to increase in scale as a mobile robot 10 moves toward the feature, with little discernable disparity between successive images of the feature. Accordingly, 3D structure of features within the center of the field of view of a forward looking camera may be difficult to ascertain from a series of images captured as the mobile robot 10 moves forward toward the features. The problem is particularly acute for small mobile robots, such as house cleaning robots, where the robot form factor dictates camera placement close to the ground (e.g., 4 inches or less above the ground). Location precision of forward looking cameras can be improved by increasing the field of view of the forward looking camera. However, increasing field of view reduces the angular resolution of the image data captured for a given image sensor resolution. Furthermore, the field of view is increased so that disparity can be observed with respect to the peripheral portions of the field of view, or the off-axis field of view, of the camera where the distortion of wide angle lenses is typically greatest and the angular resolution of the images captured by the camera is lowest.

Tilting a camera at an angle above the forward direction of motion can increase the disparity observed across the field of view of the camera when the camera moves toward an object. In particular, tilting the camera at an angle above the forward direction of motion increases the disparity observed within the center of the field of view, the portion of the camera field of view with the highest angular resolution. A feature observable within the center of the field of view of a camera tilted so that its optical axis 155 forms an acute angle relative to the horizontal axis aligned with the forward direction of motion will move upward in a series of images captured while moving toward the feature. Accordingly, objects such as (but not limited to) picture frames and televisions that are frequently hung on the walls of residences and having readily discernable features at any scale and in various lighting conditions, provide excellent navigation landmarks for mobile robots that operate in residential environments, such as house cleaning robots.

Tilting the camera 125 upward can also enable the mobile robot 10 to more precisely determine the 3D structure of the underside of objects hung on walls. Furthermore, tilting the camera 125 allows the mobile robot 10 to focus on an area within a typical indoor environment in which features are unchanging, such as those features imaged around door frames, picture frames and other static furniture and objects, allowing the mobile robot 100 to identify reliable landmarks repeatedly, thereby accurately localizing and mapping within an environment. Additionally, in implementations, the camera 125 on the mobile robot 10 is a 320×240 QVGA, 0.0768 mP camera (or 640×480 VGS, 0.3 MP camera) transferring images at a rate of less than 30 milliseconds with an image processing rate of 3 frames per second. In implementations, the camera 125 has no IR filter for better detection of features in low illumination environments. In implementations, the mobile robot 10 will create new landmarks if the number of detectable features falls below a threshold for a minimum number of features for detecting a landmark. In embodiments, the threshold number of landmarks is a cluster of identifiable features detected at a rate 1-10 landmarks per foot of travel and preferably 3 landmarks per foot of robot travel at a rate of approximately 1 ft per second or approximately 306 mm per second. In implementations, if the environment is too dark and the illumination is insufficient for feature detection, the mobile robot 10 will depend on another sensor, such as an optical dead reckoning sensor aimed at the floor (e.g. an LED or laser illuminated mouse sensor) to localize.

Disparity measurements made with respect to features visible within the center of the field of view of the camera 125 can be made more precisely by sacrificing field of view for increased angular resolution. In several embodiments, the angular resolution achieved using a specific sensor resolution is increased relative to a forward looking camera employing a wide angle lens by utilizing a tilted camera 125 that employs a view lens 140 having a horizontal field of view of, for example, 78 degrees. A typical distinction between narrow field of view lenses 140 and wide angle lenses is that perspective projection is generally a good approximation to the true imaging characteristics of narrow field of view lenses, whereas wide angle lenses introduce distortion. Accordingly, the angular resolution and modulation transfer function (MTF) of a lens tends to be more even over the field of view of a narrow field of view lens when compared to the variation in angular resolution and MTF experienced across the field of view of a wide angle lens. The distortion introduced by a wide angle lens can be corrected using computationally expensive distortion correction operations and disparity can be determined following rectification of the images captured by the camera. When a narrow field of view camera 125 is utilized, unrectified images can be utilized in subsequent image processing processes. Accordingly, use of narrow fields of view lenses in combination with appropriate VSLAM processes can provide advantages relative to more traditional VSLAM processes using wide field of view lenses in that they avoid performing the additional computationally expensive step of rectification and can locate features and/or landmarks (i.e. groups of features) with higher precision. An example of an implementation using a narrow field of view lens to capture an environment is described in detail below with reference to FIG. 16A.

Many VSLAM processes rely upon having a wide baseline between observed features to perform localization. As is discussed further below, an alternative approach involves identifying related features having distinctive 3D structure as landmarks. Relative pose of a mobile robot 10 can be readily determined based upon the 3D structure of the features forming a landmark and the appearance of the features in an image captured by the mobile robot 10. Therefore, the precision of a relative pose estimate is largely dependent upon the angular precision with which the distances between features observed within an image captured by the mobile robot's 10 camera 125 can be measured. Accordingly, configuring the mobile robot 10 with a tilted camera 125 having a narrow field of view lens can achieve improved performance over the equivalent system equipped with a forward facing camera or a camera with a wider field of view and the same resolution. Implementations using a tilted camera 125 are described in detail below with reference to FIGS. 1A and 2A-B.

In many embodiments, the field of view of a mobile robot's 10 camera 125 and the specific angle formed between the camera's optical axis 155 and the forward direction of motion is determined based upon the requirements of specific applications including (but not limited to) the frame rate of the camera 125, the speed of the mobile robot 10, and the processing capacity of the processor(s) utilized to perform image processing within the mobile robot 10. As can readily be appreciated, the greater the speed of the mobile robot 10 the greater the observed disparity between captured frames. Disparity is observed by overlapping the FOV of frames, and the mobile robot 10 moves at a speed of between 220 mm per second and 450 mm per second and preferably travels at a speed of 306 mm per second. Increasing the tilt of the camera 125 can further increase the disparity. The ability to observe the disparity depends upon the rate at which the mobile robot 10 can capture and process frames of image data in real time. A lower frame rate can be compensated for by a larger field of view. As noted above, however, increasing field of view can come at the computational cost of rectifying the captured images. Therefore, in many optional configurations of the mobile robot 10, camera 125 tilt and field of view are selected to meet the requirements of a specific mobile robot and its operating environment.

The effective field of view of the navigation system 120 can be increased without decreasing angular resolution by adding additional cameras 125, 410 positioned at different locations around the mobile robot 10. In one optional aspect of the invention, each camera 125, 410 is housed within a separate recess 130 in the body 100 of the mobile robot 10 with a separate protective lens cover 135. Certain embodiments may include both a front facing tilted camera 125 and one or more rear facing tilted cameras 410. Implementations using multiple cameras are described in detail with reference to FIGS. 4 and 5 below. The use of several cameras 125, 410 may allow the mobile robot 10 to observe more features and/or landmarks for use in VSLAM while maintaining an angular precision with which these features are detected. Readily identifying landmarks in one or more directions around the robot 10 assists with quickly re-localizing to resume a cleaning mission and continue to build a map of the environment following a kidnapping event in which the robot 10 is moved or lost. Furthermore, a rear facing tilted camera 410 may allow the VLSAM process to use the same landmarks irrespective of the direction of motion. This can be useful in a mobile robot 10 that navigates an environment in a "corn-row" pattern. In this situation, every time the mobile robot 10 turns around, it can use features and/or landmarks that were visible to the forward facing camera 125 to navigate on the return path using image data captured by the rear facing camera 410. Furthermore, the rear facing tilted camera 410 may detect the landmarks with a higher angular precision than if the mobile robot 10 were to use, for example, a 360 degree omnidirectional camera given the increased spatial resolution of the narrower field of view lens (assuming comparable sensor resolution).

During operation, the one or more cameras 125 mounted on the mobile robot 10 may become obstructed for any of a variety of reasons. For example, dust and debris may accumulate on the camera lens 140, or a lens cover 135, over time and with use of the mobile robot 10 and thus occlude portions of the images being captured. The mobile robot 10 is able to detect when some type of obstruction is occluding one or more portions of a camera lens 140. When an occlusion is detected, the mobile robot 10 may provide a notification that notifies a user to, for example, clean a lens cover 135 protecting the camera lens 140 in order to remove the occlusion. In order to detect the presence of an occlusion obstructing a portion of the field of view of a camera 125, some embodiments analyze the particular portions of the images providing useful information for a VSLAM process, and based on this analysis, are able to determine that certain other portions of the field of view may be occluded. In particular, some embodiments may maintain a histogram of the different portions of the field of view and a frequency with which each portion is capturing image data that is being used to generate new landmarks and/or recognize existing landmarks during the navigation of a mobile robot 10 through an environment using VSLAM. Regions that are used with low frequency can be flagged as occlusions and notifications generated accordingly.

Although much of the discussion that follows describes camera configurations used in combination with specific VSLAM processes, the techniques disclosed herein can be utilized by the mobile robot 10 configured using any of a variety of different mapping and navigation mechanisms. Accordingly, various optional configurations of the mobile robot 10 incorporating one or more tilted cameras 125 for use in navigating an environment are discussed further below.

Mobile Robots with Enhanced Vision Sensor Configurations

The mobile robot 10 incorporates a navigation system 120 including a camera 125 that can capture image data used by a VSLAM processes in the navigation of the mobile robot 10 and the mapping of the environment surrounding the mobile robot 10. The tilted camera 125 used in the navigation system 120 of the mobile robot 10 is illustrated in FIGS. 1A-2B. In particular, FIG. 1 illustrates front perspective view of the mobile robot 10 and FIG. 2 illustrates the recess 130 disposed substantially in the middle of the body 100 of the mobile robot 10 containing the tilted camera 125. As can readily be appreciated, the camera 125 is protected by a lens cover 135 that is configured so that one edge of the lens cover 135 is closer to the opening of the recess 130 than a second edge of the lens cover 135. In this way, the lens cover 135 forms an acute angle $\alpha$ with the optical axis 155 of the camera 125 that is closer to perpendicular than the angle $\phi$ formed between a plane defined by the opening in the recessed structure 130 within the body 100 of the mobile robot 10 and the optical axis 155 of the camera 125. In some embodiments, the acute angle $\alpha$ may range between 15 and 70 degrees and the acute angle $\phi$ may range between 10 and 60 degrees. Angling the lens cover 135 in this way is an optional aspect of the invention and the lens cover 135 can be implemented in the plane of the opening in the recess 130 of the mobile robot body 100 containing the tilted camera 125 or recessed, but parallel to the plane of the opening in the recess 130 of the mobile robot body 100. The configuration of the tilted camera 125 within the recess 130 in the body 100 of the mobile robot 10 is discussed further below.

Figure 1B:
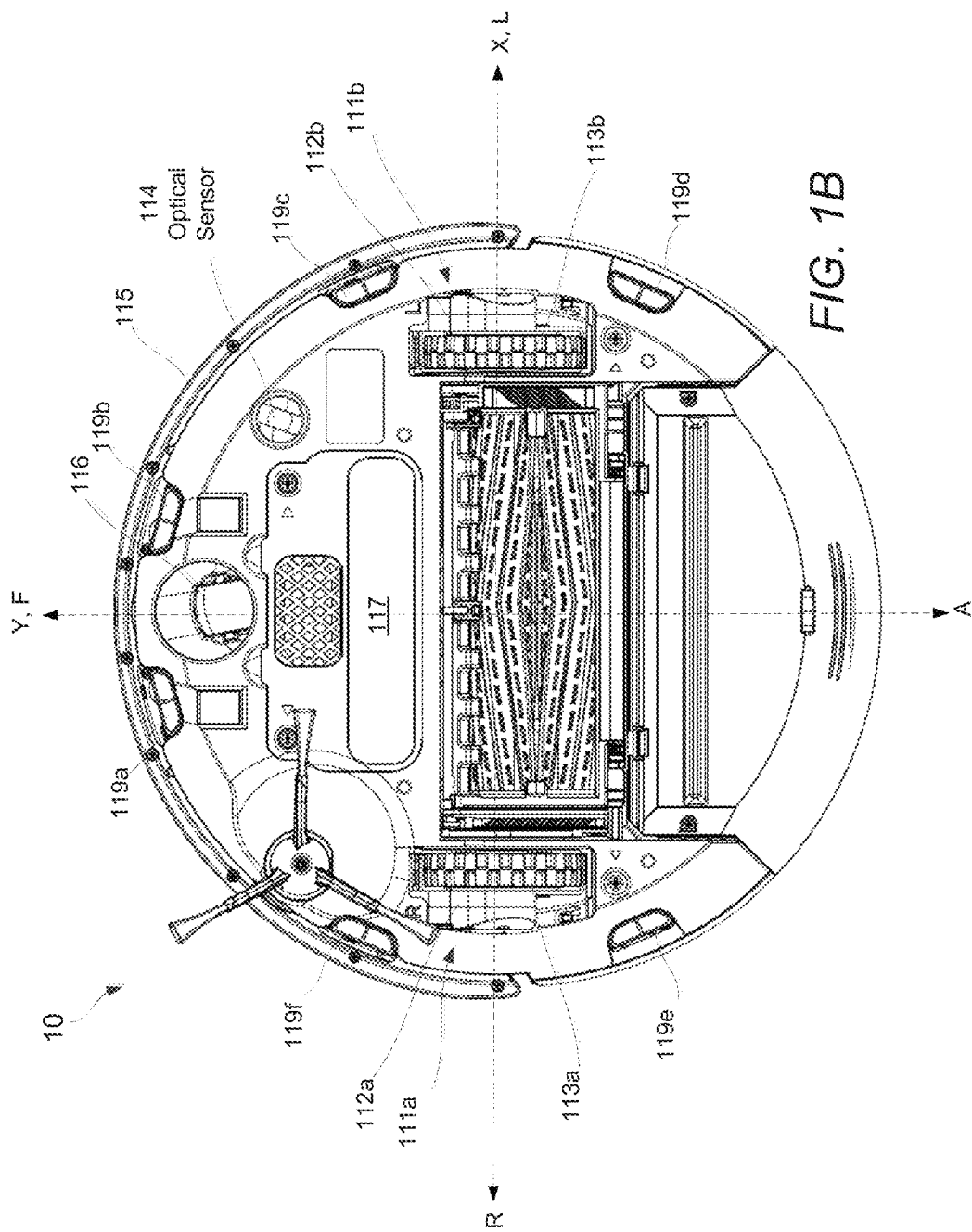
FIG. 1B illustrates a bottom of a mobile robot.
Figure 1C:
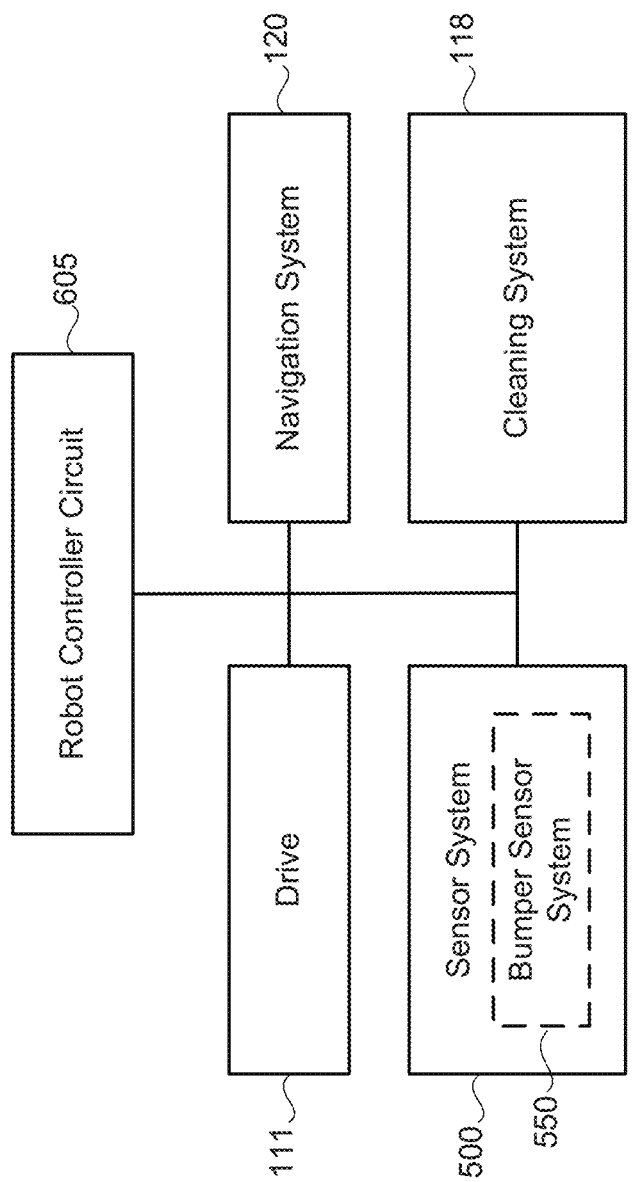
FIG. 1C illustrates a block diagram of a controller circuit of a robot.

As shown in FIG. 1B showing the bottom of the robot 10 and FIG. 1C depicting a block diagram of a controller circuit 605 of the robot 10 and systems of the robot 10 operable with the controller circuit 605, the mobile robot 10 includes a body 100 supported by a drive 111 located beneath the body 100 including left and right drive wheel modules 111a, 111b, that can maneuver the robot 10 across a floor surface. In implementations, the drive is that of the robot described in US Patent Application Publication No. 2012/0317744, herein incorporated by reference in its entirety. In many implementations, the mobile robot 10 is no taller than 4 inches from a floor surface in order to allow the mobile robot 10 to navigate through tight spaces within a typical indoor environment.

The mobile robot 10 can be configured to actuate its drive 111 based on a drive command. In some embodiments, the drive command may have x, y, and θ components and the command may be issued by a controller circuit 605. The mobile robot body 100 may have a forward portion 105 corresponding to the front half of the shaped body, and a rearward portion 110 corresponding to the back half of the shaped body. The drive includes right and left driven wheel modules 111a, 111b that may provide odometry to the controller circuit 605. The wheel modules 111a, 111b are substantially disposed along a transverse axis X defined by the body 100 and include respective drive motors 112a, 112b driving respective wheels 113a, 113b. The drive motors 112a, 112b may releasably connect to the body 100 (e.g., via fasteners or tool-less connections) with the drive motors 112a, 112b optionally positioned substantially over the respective wheels 113a, 113b. The wheel modules 111a, 111b can be releasably attached to the chassis and forced into engagement with the cleaning surface by springs. The mobile robot 10 may include a caster wheel 116 disposed to support a portion of the mobile robot body 100, here, a forward portion of a round body 100. In other implementations having a cantilevered cleaning head, such as a square front or tombstone shaped robot body 100, the caster wheel is disposed in a rearward portion of the robot body 100. The mobile robot body 100 supports a power source (e.g., a battery 117) for powering any electrical components of the mobile robot 10.

Referring again to FIGS. 1A and 1B, the mobile robot 10 can move across a cleaning surface through various combinations of movements relative to three mutually perpendicular axes defined by the body 100: a transverse axis X, a fore-aft axis Y, and a central vertical axis Z. A forward direction of motion along the fore-aft axis Y is designated F (sometimes referred to hereinafter as "forward"), and an aft drive direction along the fore-aft axis Y is designated A (sometimes referred to hereinafter as "rearward"). The transverse axis X extends between a right side R and a left side L of the robot substantially along an axis defined by center points of the wheel modules.

In many embodiments, a forward portion 105 of the body 100 carries a bumper 115, which can be utilized to detect (e.g., via one or more sensors of the bumper sensor system 550) events including (but not limited to) obstacles in a drive path of the mobile robot 10. Depending upon the behavioral programming of the mobile robot 10, it may respond to events (e.g., obstacles, cliffs, walls) detected by the bumper 115, cliff sensors 119a-119f, and one or more proximity sensors 120a-120n by controlling the wheel modules 111a, 111b to maneuver the robot 10 in response to the event (e.g., back away from a detected obstacle).

As illustrated, a user interface 126 is disposed on a top portion of the body 100 and can be used to receive one or more user commands and/or display a status of the mobile robot 10. The user interface 126 is in communication with the controller circuit 605 carried by the robot 10 such that one or more commands received by the user interface 126 can initiate execution of a cleaning routine by the robot 10.

Figure 22:
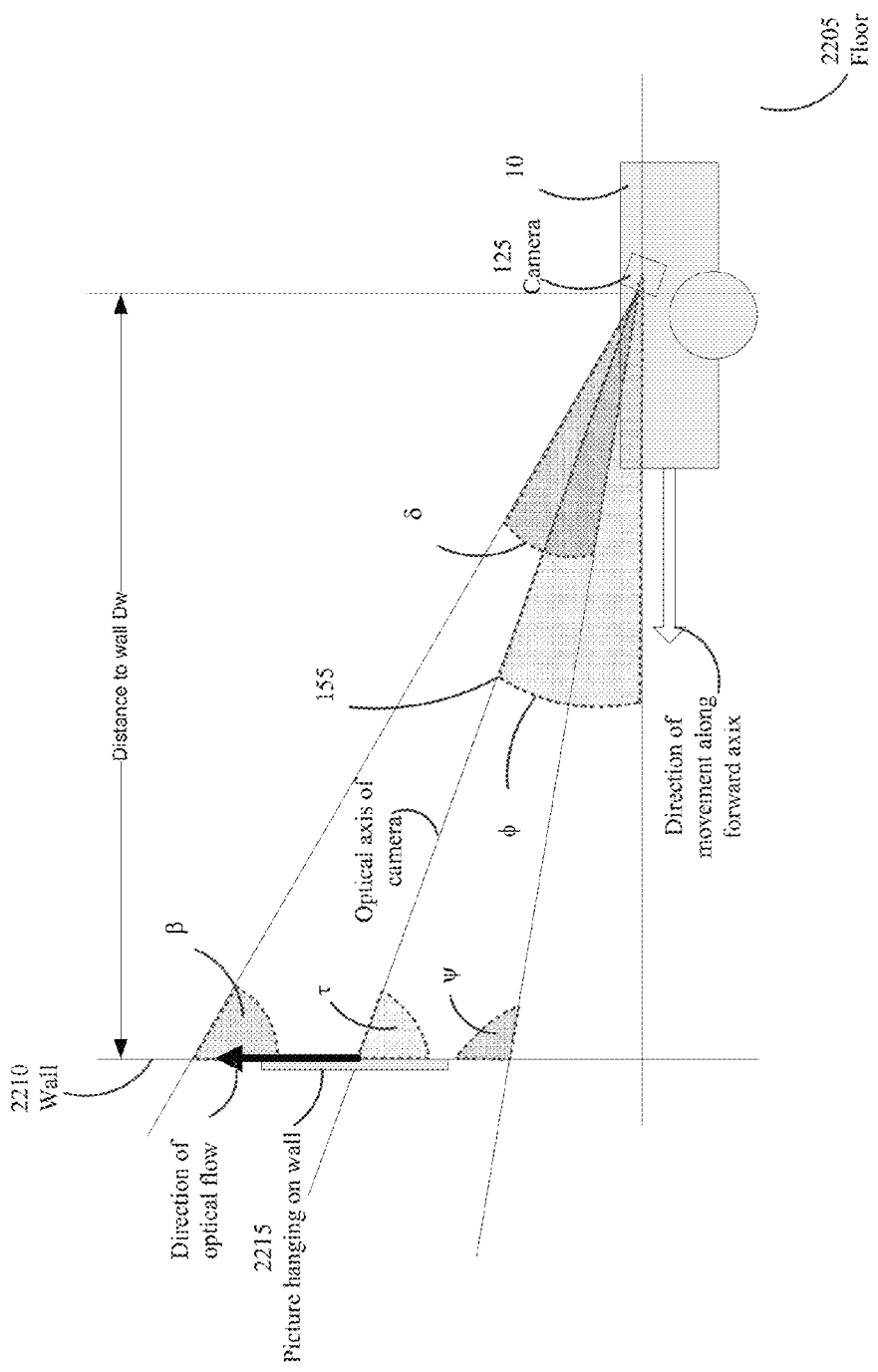
FIG. 22 illustrates a robot having a top surface that is not more than 4 inches from the floor surface, a camera mounted under the top surface of the mobile robot, having a field of view spanning a frustum having a field of view angle δ of approximately 50-60 degrees in the vertical direction and an optical axis 155 at an acute angle φ of approximately 30 degrees above horizontal.

The mobile robot 10 may also include a camera 125 navigation system 120 embedded within the body 100 of the robot 10 beneath the top cover 108. The navigation system 120 may include one or more cameras 125 (e.g., standard cameras, volumetric point cloud imaging cameras, three-dimensional (3D) imaging cameras, cameras with depth map sensors, visible light cameras and/or infrared cameras) that capture images of the surrounding environment. In one optional configuration, the camera 125 captures images of the environment that are positioned at an acute angle relative to the axis of motion (e.g., F or A) of the mobile robot 10. For example, as illustrated in FIG. 22, in implementations of a robot 10 having a top surface 108 that is not more than 4 inches from the floor surface, a camera 125 mounted under the top surface 108 of the robot 10, having a field of view spanning a frustum of approximately 50-60 degrees in the vertical direction and an optical axis 155 angled at approximately 30 degrees above horizontal will detect features in the environment at a height of generally 3-14 feet. For example, a mobile robot 10 of these dimensions with these camera settings will see objects at a height of approximately 6 inches to 4.5 feet at a distance of 3 feet, at a height of approximately 9 inches to 7.5 feet at a distance of 5 feet and at a height of approximately 1.2 feet to 14 feet at a distance of 10 feet. By focusing the undistorted central portion of the camera 125 field of view on an area in which features are unchanging, such as those features imaged around door frames, picture frames and other static furniture and objects, the robot 10 identifies reliable landmarks repeatedly, thereby accurately localizing and mapping within an environment.

In these embodiments, the lens 140 (FIGS. 2A and 2B) of the camera 125 is angled in an upward direction such that it primarily captures images having their reliable, undistorted portions focused on feature rich, unchanging areas of the walls, wall-ceiling interfaces, and a portion of the ceiling surrounding the mobile robot 10 in a typical indoor environment. As noted above, many environments including (but not limited) residential housing environment include varied and static objects hung and clustered on walls that provide features and/or landmarks that are useful for performing navigation. Objects typically available in the region of approximately 2-15 feet (e.g., 3-10 feet, 3-9 feet, 3-8 feet), such as door and window frames, pictures and large furniture, have little displacement therefore provide reliably imaged feature geometry that results in the creation of more accurately and reliably identified landmarks. By aggregating reliable features in this region in a narrow field of view, determination of landmarks improves and localization determination therefore improves. By aggregating varied and distinguished features imaged from items having no displacement, the mobile robot 10 builds a reliable map of landmarks.

The camera 125 may optionally be tilted so that the lower periphery of the field of view of the camera 125 is unoccluded by the body 100 of the mobile robot 10. Alternatively, in implementations, the body 100 of the mobile robot 10 partially occludes a lower portion of the field of view of the tilted camera 125 and the controller circuit 605 discards this portion of the field of view when imaging features. As noted above, tilting the camera 125 can increase the amount of disparity observed across the field of view of the camera 125 as the mobile robot 10 moves through the environment. In an implementation, the mobile robot 10 employs a tilted camera 125 with optics having a sufficiently narrow field of view so that perspective projection can be assumed to be a good approximation to the true imaging characteristics of the narrow field of view lens. Subsequent image processing can be performed without rectifying the images and the camera 125 can observe features with a higher angular resolution than a wider angle lens that would also introduce distortion.

The images captured by the camera 125 may be used by VSLAM processes in order to make intelligent decisions about actions to take to maneuver the mobile robot 10 about an operating environment. While the camera 125 of the navigation system 120 is illustrated in FIGS. 1A-1C and 2A-2B as being contained within a centrally located recess 130 under the top surface 108 of the mobile robot 10, cameras 125 forming part of the mobile robot's 10 navigation system 120 can additionally or alternatively be arranged at any of one or more positions and orientations on the mobile robot 10, including on or within the front bumper and along the sides of the mobile robot.

In addition to the camera 125 of the navigation system 120, the mobile robot 10 may include different types of sensor systems 500 in order to achieve reliable and robust autonomous movement. The additional sensor systems 500 may be used in conjunction with one another to create a perception of the mobile robot's 10 environment sufficient to allow the robot to make intelligent decisions about actions to take in that environment. The various sensor systems may include one or more types of sensors supported by the robot body 100 including, but not limited to, obstacle detection obstacle avoidance (ODOA) sensors, communication sensors, navigation sensors, range finding sensors, proximity sensors, contact sensors (e.g. bumper sensors), sonar, radar, LIDAR (Light Detection And Ranging, which can entail optical remote sensing that measures properties of scattered light to find range and/or other information of a distant target), and/or LADAR (Laser Detection and Ranging). In some implementations, the sensor system includes ranging sonar sensors, proximity cliff detectors 119a-119f, proximity sensors 120a-120n (e.g., "n" being an unlimited number in an array of proximity sensors looking out the sidewalls of the robot 10) contact sensors in the bumper sensor system 550, a laser scanner, and/or an imaging sonar.

There are several challenges involved in placing sensors on a robotics platform. First, the sensors are typically placed such that they have maximum coverage of areas of interest around the mobile robot 10. Second, the sensors are typically placed in such a way that the robot itself causes an absolute minimum of occlusion to the sensors; in essence, the sensors should not be placed such that they are blinded by the robot itself. Third, the placement and mounting of the sensors should not be intrusive to the rest of the industrial design of the platform. In terms of aesthetics, it can be assumed that a robot with sensors mounted inconspicuously is more attractive than otherwise. In terms of utility, sensors should be mounted in a manner so as not to interfere with normal robot operation (e.g., snagging on obstacles).

Additional options that can be employed in the implementation of the navigation system 120 of the mobile robot 10 are discussed further below.

Machine Vision System

In order to navigate through an environment, the mobile robot 10 may use information gathered from various different types of sensors in order to ascertain the characteristics of its surrounding environment. As noted above, the mobile robot 10 uses a navigation system 120 that includes one or more cameras 125 that capture images of the surrounding environment. The images may be provided to a VSLAM process for use in the localization and mapping of the mobile robot 10 within the environment. FIG. 2A illustrates a top perspective view and FIG. 2B illustrates a cross-sectional view of the tilted camera 125 of the mobile robot 10 illustrated in FIG. 1A. In particular, FIG. 2A (and corresponding FIG. 2B) illustrates a tilted camera 125 housed within a recessed structure 130 in the body 100 of the mobile robot 10 and covered by a lens cover 135. As depicted in FIGS. 2B and 22, the camera 125 includes a camera lens 140 with an optical axis 155 that is at an acute angle $\phi$ relative to horizontal axis defining the direction of motion of the mobile robot 10. As such, the lens 140 is primarily aimed in a direction that will capture the walls, the wall-ceiling intersections and, to a lesser extent the, ceilings within a typical indoor environment. For example, as illustrated in FIG. 22, in implementations of a robot 10 having a top surface 108 that is not more than 4 inches from the floor surface 2205, a camera 125 mounted under the top surface 108 of the mobile robot 10, having a field of view spanning a frustum having a field of view angle $\delta$ of approximately 50-60 degrees in the vertical direction and an optical axis 155 at an acute angle $\phi$ of approximately 30 degrees above horizontal will detect features 2215 in the environment at a height of generally 3-14 feet. For example, a mobile robot 10 of these dimensions with these camera settings will see objects at a height of approximately 6 inches to 4.5 feet at a distance Dw of 3 feet, at a height of approximately 9 inches to 7.5 feet at a distance Dw of 5 feet and at a height of approximately 1.2 feet to 14 feet at a distance Dw of 10 feet. By focusing the undistorted field of view of a tilted camera 125 on a feature rich area in which features are unchanging, such as those features imaged at door frames, picture frames 2215 and other static furniture and objects with readily imaged feature geometry, the robot 10 identifies reliable landmarks repeatedly, thereby accurately and efficiently localizing and mapping within an environment. This is particularly useful for re-localizing after a kidnapping event that interrupts the robot's 10 mission. A robot 10 that has been moved from one location to another or that enters a dark room or under furniture area quickly identifies a unique set of features at these heights and knows its location readily and with exactitude. A camera aimed at an unchanging ceiling or a ceiling with repetitive features, such as a dropped ceiling with tiles or a ceiling with evenly spaced lighting features, will not readily know its location and will have to seek out unique features on which to localize, such as a corner of a room. The mobile robot 10 of the present invention therefore is efficient and accurately picks up its cleaning routine at a useful location without having to move randomly to an area where a landmark is recognizable on the map.

In the implementation of FIG. 22, the field of view of the camera 125 hits a vertical planar surface, such as a household wall, at an upper angle $\beta$ of 35 degrees and lower angle $\psi$ of 95 degrees and the optical axis 155 intersects the vertical planar surface at a lower angle $\tau$ of 60 degrees. Wall features become useful far sooner as they are approached with a camera 125 having a smaller field of view. For example, in implementations, the robot 10 includes such a tilted camera 125 as that described immediately above aimed at a wall 2210 and having a field of view of 50 degrees, which equates to 3 times the resolution of a directly forward looking camera (e.g., at a distance from the wall Dw of 8 ft, for directly ahead features about 12 pixels per inch, and for 8 foot high features, about 6 pixels per inch). The features with the highest resolution will be the lowest features on the wall, and so the camera 125 is aimed so as not to miss those features. The configuration of the camera 125 of FIG. 22 creates more trackable optical flow but maintains a high pixel count by having at least half of the field of view above 45 degrees. Features at 45 degrees from the robot 10 that in the field of view of the camera 125 will instantaneously track up the very middle of the camera 125 field of view at the same speed as the mobile robot 10. In embodiments, the mobile robot 10 moves at a speed of between 220 mm per second and 450 mm per second and preferably moves at a speed of approximately 306 mm per second, or 1 ft for second. As the mobile robot 10 advances toward the wall 2210, all objects will grow in the field of view. Features lower than 45 degrees will track more slowly and accelerate up and sideways than those at 45 degrees, and features higher than 45 degrees will track faster and accelerate up more quickly than those at 45 degrees. In implementations, the features lower than 45 degrees will track slower than approximately 1 ft per second and features higher than 45 degrees will track faster than 1 ft per second. In implementations, a first set of edge pixels track vertically at a rate that appears faster than the ego-motion of the mobile robot 10 and a second set of edge pixels tracks vertically at a rate that appears equal to or slower than the robot ego-motion. In implementations, the camera 125 is arranged less than 6 inches from the floor, with a 50 degree field of view directed to span a 50 degree range limited between −10 degrees and 90 degrees above the horizon (e.g., extending from 30-80 degrees), and the camera 125 is directed to be limited to viewing portions of walls forward of the mobile robot 10 at a height of between 3 and 8 feet as long as the mobile robot 10 is a distance Dw of between 3-10 feet from the wall 2210.

Returning to the implementation of FIGS. 2A and 2B, the lens cover 135 is also depressed into the recessed structure 130 and is positioned under the top surface 108 of the mobile robot 10. In addition, the lens cover 135 is aligned at an acute angle α relative to the optical axis 155 of the camera, which is greater than the acute angle φ between the plane forming the opening of the recessed structure 130 and the optical axis 155 of the camera 125. In embodiments, the acute angle α ranges between 15 and 70 degrees and the acute angle φ ranges between 10 and 60 degrees. Angling the lens cover 125 relative to the optical axis 155 prevents unwanted imaging problems, such as light reflections and/or refractions that might block the camera 125 from effective imaging of features.

As noted above, the mobile robot 10 can optionally include a narrow field of view lens 140 that provides images in which perspective projection can be assumed to be a good approximation to the true imaging characteristics of narrow field of view lenses. Where a narrow field of view lens 140 is utilized by the mobile robot 10, the transfer of mechanical stresses from the mobile robot 10 to the lens 140 can distort the lens eliminating some of the benefits of utilizing the narrow field of view lens 140 by introducing a complex distortion correction process as part of the image processing pipeline. The design of the lens holder can play an important role in preventing the transfer of mechanical stresses from the mobile robot 10 to the lens 140 and avoiding distortion of the lens 140. Implementations of lens holders that can optionally be utilized in camera(s) 125 of the mobile robot 10 are discussed further below.

Lens Holders

Figure 3A:
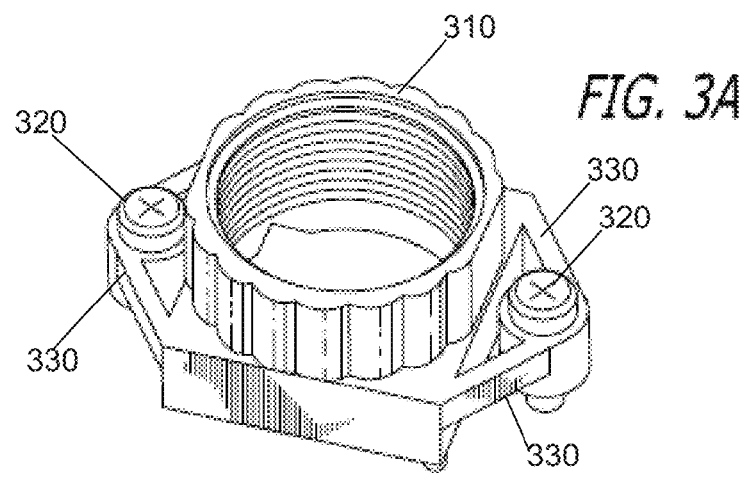
FIGS. 3A-3C illustrate a lens holder that prevents lens deformations that may occur in the camera lens due to transfer of mechanical stresses from a mobile robot to the lens.
Figure 3B:
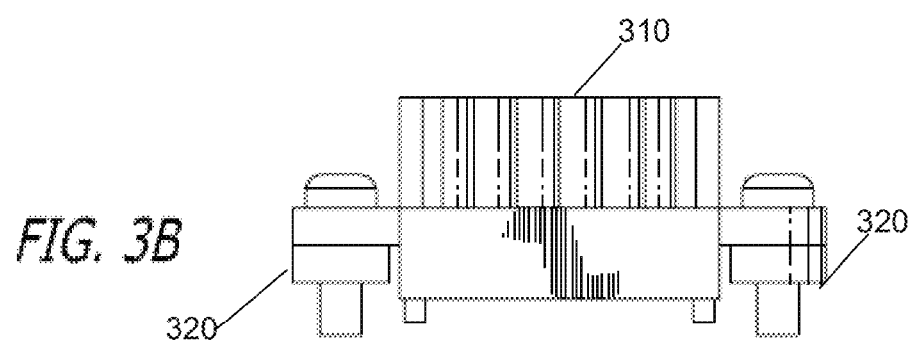
Figure 3C:
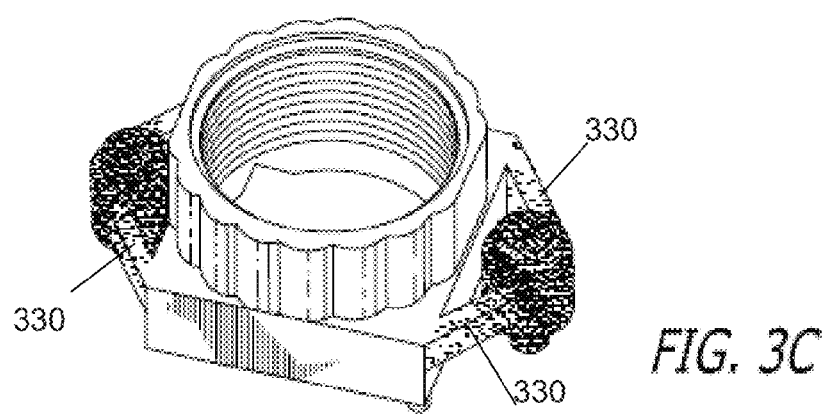

FIGS. 3A-3C depict an implementation of a lens holder 310 that prevents lens deformations that may occur in the camera lens 140 due to transfer of mechanical stresses from the mobile robot 10 to the lens 140. FIG. 3A illustrates a lens holder 310 for holding a camera lens 140. The lens holder 310 is connected to a set of screw bosses 320 supported by a set of spider ribs 330. FIG. 3B illustrates a side view of the lens holder 310. In particular, this figure illustrates that the bottom of the screw bosses 320 are positioned a distance above the lens holder body 310. In the illustrated lens holder 310, the screw bosses 320 are positioned 0.5 mm above the lens holder body 310. The specific distance that the screw bosses 320 are positioned above the lens holder body 310 is typically dependent upon the requirements of a given application. FIG. 3C illustrates that almost all of the deformation is experienced at the spider ribs 330 (e.g. stresses shown in dark colored area), with little to no deformation occurring in the lens holder body 310. Designs that connect the lens holder body 310 directly to the screw bosses 320 without the spider ribs 330 often experience significant amounts of deformation throughout the lens holder body 310, thereby deforming the lens 140 being held within the body 310. By using the spider ribs 330, the lens holder 310 is able to redirect the force exerted from screwing the lens holder 310 onto the spider legs 330 while maintaining the structure of the lens holder body 310. Although a range of lens holder designs with spider ribs are described above with reference to FIGS. 3A-3C, any of a variety of spider rib design configurations can be constructed, including three or more spider ribs positioned at different locations along the lens holder body and at different heights relative to the screw bosses.

Although the mobile robot 10 is shown with a single camera 125 embedded within the top cover of the mobile robot body 100 in FIGS. 1A-2B, the mobile robot 10 can include any of a variety of optional camera configurations, including (but not limited to) one or more cameras 125 positioned at different locations along the mobile robot body 100 and at one or more acute viewing angles.

Mobile Robot with Forward and Backward Cameras

The mobile robot 10 may optionally include multiple cameras distributed around the body 100 of the mobile robot. A particularly advantageous configuration involves the use of a tilted forward facing camera 125 and a tilted backward facing camera 410. The forward and backward facing tilted cameras 125, 410 can optionally be contained within separate recesses 130a, 130b within the top 108 of the body 100 of the mobile robot 10 and protected using lens covers 135a, 135b configured in a manner similar to those described above with respect to the mounting of a single recess 130 and tilted camera 125 behind a lens cover 135 with reference to FIGS. 1A and 2A-2B. The mobile robot 10 configured with forward and backward facing tilted cameras 125, 410 contained within separate recesses 130a, 130b within the top 108 of the body 100 of the mobile robot 10 and protected using lens covers 135a, 135b is illustrated in FIG. 4. In particular, FIG. 4 illustrates the mobile robot 10 configured with a front facing tilted camera 125 aimed in a direction that captures the environment in front of the mobile robot 10 and a rear facing tilted camera 410 aimed in a direction that captures the environment behind the mobile robot 10. Much like the embodiment described above with regard to FIG. 22, the cameras 125, 410 are angled at about 30 degrees (e.g. 25 degrees, 35 degrees) to focus an approximately 50 degree high frustum (e.g. 45 degrees, 55 degrees) field of view on static features located in the range of 3-8 feet high. In embodiments, the cameras focus an approximately 60 degree high frustum (e.g., 55 degrees, 65 degrees) field of view on static features located in the range of 3-8 feet high. The front and rear cameras 125, 410 are embedded within separate recessed structures 130a, 130b within the mobile robot body 100 and are each covered by a respective lens cover 135a, 135b. Each lens cover 135a, 135b is set back from the opening of its corresponding recessed structure 130a, 130b containing the tilted camera 125, 410 and is aligned at an acute angle α relative to the plane (e.g., the top surface 108) of the opening of the recessed structure 130a, 130b.

A cross-sectional view of the front and rear facing tilted cameras 125, 410 of the mobile robot 10 configured in the manner illustrated in FIG. 4 is conceptually illustrated in FIG. 5. The tilted cameras 125, 410 are positioned such that the respective optical axis 155a, 155b of each of the cameras 125, 410 is aligned at an acute angle φ above the top surface 108 in the forward and rearward directions of motion of the mobile robot 10. By setting the cameras 125, 410 at these angles, the front facing camera 125 is primarily aimed at the walls, ceiling, tops of largely immovable furniture such as TV armoires, couches and countertops directly in front of the mobile robot 10 within a typical indoor environment and the rear facing camera 410 is primarily aimed at the walls, ceiling tops of largely immovable furniture such as TV armoires, couches and countertops behind the mobile robot 10 as it travels in the forward direction. The use of tilted front and rear facing cameras 125, 410 allows the mobile robot 10 to observe a high concentration of reliable, static, and unchanging features to build repeatedly recognizable uniquely identifiable landmarks within the surrounding environment for use in VSLAM while maintaining an angular precision with which these features are detected. Furthermore, the tilted rear camera 410 may allow the VLSAM process to use the same landmarks previously used by the tilted front camera 125 when these landmarks are no longer within the field of view of the front camera 125. This may be particularly useful, for example, when the mobile robot 10 is configured to navigate its environment in a "corn-row" pattern and when the mobile robot 10 resumes localizing following a kidnapping event in which it is forcibly moved to a new location or loses track of pose because of lighting variation. In this situation, every time the mobile robot 10 turns around, the same landmarks that were observed using the front camera 125 are captured by the rear facing camera 410 to navigate on the return path. Furthermore, the rear facing camera 410 may detect the landmarks with a higher angular precision than if the mobile robot 10 were to use, for example, a 360 degree omnidirectional camera, assuming a same sensor resolution. This is due to the increased spatial resolution that may be attained with the narrowed lens when capturing features within the surrounding environment.

In some embodiments, both cameras 125, 410 may capture images of the surrounding environment and provide these images to a VSLAM process. In certain embodiments, only one of the cameras 125 or 410 provides a VSLAM process with input images. For example, the mobile robot 10 may use the front facing camera 125 to detect and track a set of features associated with a landmark while moving in a forward direction toward the landmark and, upon switching directions, use the rear facing camera 410 to detect and track the same set of features while moving away from the landmark.

The mobile robot 10 may simultaneously capture images of the surrounding environment using both the tilted front and rear cameras 125, 410, thereby capturing a larger portion of the surrounding environment in less time than a single-camera 125 enabled robot 10. The mobile robot 10 may optionally utilize a wide angle, omnidirectional, panoramic or fish-eye type lens to capture more of the surrounding environment at the expense of a decreased angular resolution. However, by using two cameras 125, 410 each with a narrowed field of view in comparison to, for example, a panoramic camera, to provide input images, the VSLAM process is able to detect a similar number of features as would be achieved using a panoramic, or similar wide field of view lens, but each feature is captured at a higher angular resolution with a narrower field of view lens (assuming comparable sensor resolution). In particular, the narrowed field of view spans a frustum of approximate 50-60 degrees in the vertical direction and is able to detect features in the environment at a height of generally 3-14 feet. As is discussed below, providing a VSLAM process with higher precision measurements of the locations of features visible within images captured by the machine vision sensor system 120 enables the VSLAM process to map the environment and localize the location of the mobile robot 10 with precision.

Although various optional configurations of the mobile robot 10 involving tilted front and rear facing cameras 125, 410 are described above with respect to FIGS. 4 and 5, the mobile robot 10 can optionally be configured using any of a variety of camera configurations including a tilted front camera 125 combined with a forward camera (not shown) that is aligned in the direction of motion, multiple front facing cameras tilted at different angles, a stereo pair of cameras, two or more tilted cameras having adjacent or partially overlapping fields of view, and/or front and rear cameras 125, 140 angled at different angles to accommodate, for example, a sloped top surface 108 of a robot 10. The process of performing VSLAM using image data captured by one or more tilted cameras 125 in the navigation system 120 of the mobile robot 10 is typically performed by a controller circuit 605, which may also be responsible for implementing other behaviors supported by the mobile robot 10. Robot controllers 605 and VSLAM processes performed by robot controllers in accordance with various embodiments of the invention are discussed further below.

Robot Controller

The behavior of a mobile robot 10 is typically selected from a number of behaviors based upon the characteristics of the mobile robot's 10 surrounding operating environment and/or the state of the mobile robot 10. In many embodiments, characteristics of the environment may be ascertained from images captured by a navigation system 120. Captured images can be used by one or more VSLAM processes to map the environment surrounding the mobile robot 10 and localize the position of the mobile robot 10 within the environment.

Figure 6:
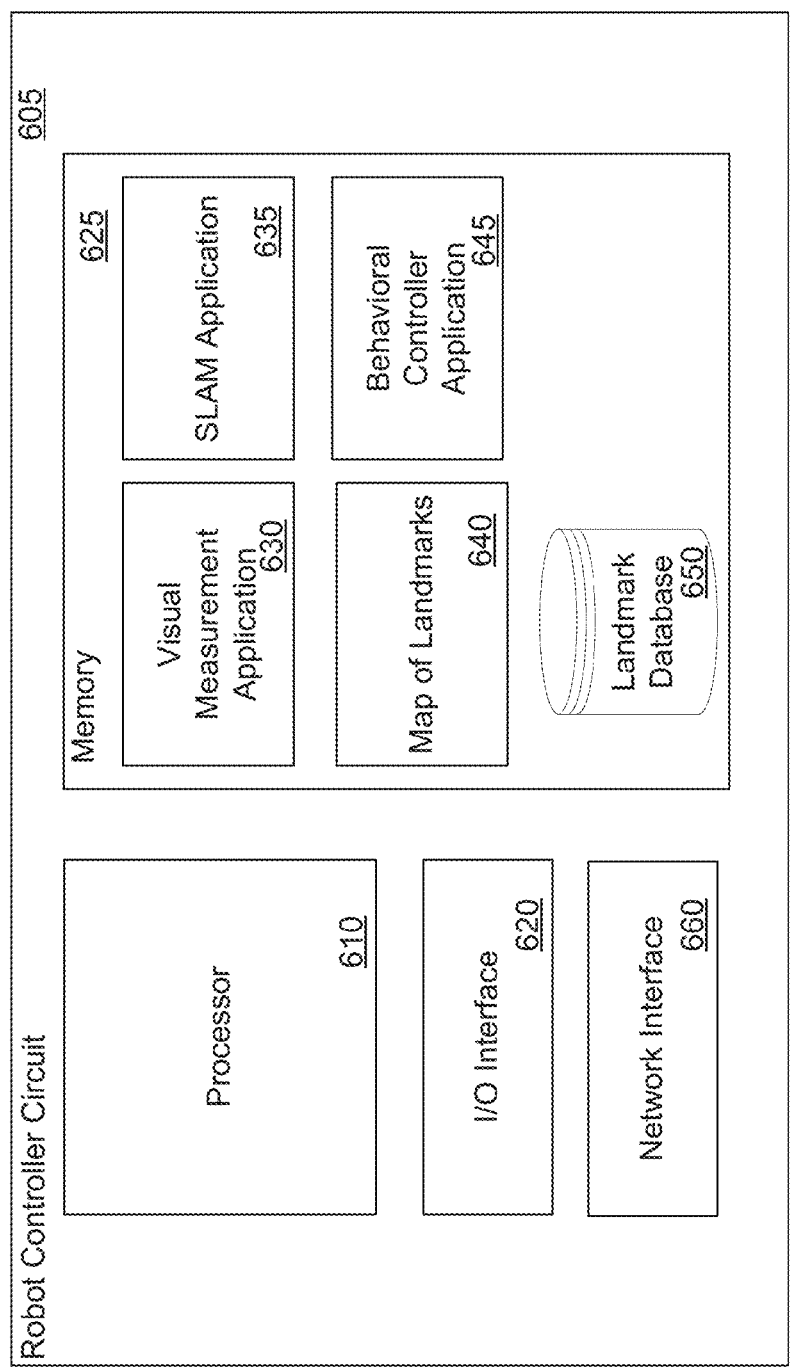
FIG. 6 illustrates a mobile robot controller circuit that can be used for VSLAM using an enhanced navigation system.

A mobile robot controller circuit 605 (hereafter "controller circuit 605") that can be used for VSLAM using an enhanced navigation system 120 is illustrated in FIG. 6. The robot controller circuit 605 includes a processor 610 in communication with a memory 625, a network interface 660 and an input/output interface 620. The processor 610 can be a single microprocessor, multiple microprocessors, a many-core processor, a microcontroller, and/or any other general purpose computing system that can be configured by software and/or firmware. The memory 625 contains a visual measurement application 630, a SLAM application 635, one or more maps of landmarks 640, a behavior control application 645 and a landmarks database 650. The memory 625 can optionally contain any of a variety of software applications, data structures, files and/or databases as appropriate to the requirements of specific applications.

The landmarks database 650 contains information concerning a number of previously observed landmarks that the mobile robot 10 can utilize to perform visual measurements from which a relative pose can be determined. A landmark can be considered to be a collection of features having a specific 3D structure. Any of a variety of features can be utilized to identify a landmark including (but not limited to) 2D features, 3D features, features identified using Scale-invariant Feature Transform (SIFT) descriptors, features identified using Speeded Up Robust Features (SURF)

descriptors, and/or features identified using Binary Robust Independent Elementary Features (BRIEF) descriptors. When the mobile robot 10 is configured as a housecleaning robot, a landmark could be (but is not limited to) a set of features identified based upon the 3D structure of the corner of a picture frame or a set of features identified based upon the 3D structure of a doorframe. Such features are based on static geometry within the room and, although the features have some illumination and scale variation, they are more readily discerned and identified in aggregate as landmarks than objects located within a lower region of the environment that are frequently displaced (e.g. chairs, trash cans, pets, etc.) In implementations, the camera 125 on the mobile robot 10 is a 320×240 QVGA, 0.0768 MP camera (or 640×480 VGP, 0.3 MP camera) that has no IR filter for better detection of features in low illumination environments. In implementations, particularly when the robot 10 is starting a new mission without storing data between runs or entering a previously unexplored area, the mobile robot 10 will create new landmarks. In implementations, the mobile robot 10 also will create new landmarks if lighting variations make previously viewed features indiscernible and the number of detectable features falls below a threshold for a minimum number of features for detecting a landmark. In embodiments, the threshold number of landmarks is a cluster of identifiable features detected at a rate 1-10 landmarks per foot of travel and preferably 3 landmarks per foot of robot travel at a rate of approximately 1 ft per second or approximately 306 mm per second. The robot 10 thus builds a useful localization map for features discernable at that lighting intensity and, in implementations, the robot stores one or more persistent maps with landmarks viewed at various light intensities, for example those associated with data include a time of day and calendar date associated with seasonal lighting variations. In still other implementations, if the environment is too dark and the illumination is insufficient for feature detection, the mobile robot 10 will depend on another sensor or combination sensors, such as an wheel odometry and optical dead reckoning drift detection sensor 114 (FIG. 1B) aimed at the floor (e.g. an LED or laser illuminated mouse sensor) to localize. In one implementation, the landmarks database 650 includes a landmark image captured from a specific pose that can be referred to as the landmark pose. A visual measurement involves determining a pose relative to the landmark pose. In order to facilitate visual measurement, the landmarks database 650 stores a set of features associated with each landmark and the 3D structure of the set of features.

The visual measurement application 630 matches a portion of an input image to the landmark image and then determines relative pose based upon the spatial relationship of the features from the landmark identified in the input image and the 3D structure of the identified features from the landmark retrieved from the landmarks database 650. A variety of options exist for determining relative pose based upon the features from the landmark identified in the input image and the 3D structure of the identified features including (but not limited) determining relative pose based upon the rigid transformation of the 3D structure that yields a spatial relationship of features most similar to that observed in the input image, thereby minimizing reprojection error. Alternatively or additionally, the rigid transformation yields an estimation of the most likely relative pose given the observed spatial relationship of features and knowledge of the statistical characteristics of the sources of error within the visual measurement system. Irrespective of the specific process utilized to determine the relative pose, the precision of the relative pose estimate is increased by more precisely measuring the 3D structure of the features forming a landmark and/or the spatial relationship between the features identified within an input image. Processes for creating new landmarks for use in visual measurements and for determining relative pose using landmarks are discussed further below.

Referring again to FIG. 6, the SLAM application 635 estimates the location of the mobile robot 10 within a map of landmarks based upon a previous location estimate, odometry data, and at least one visual measurement received from the visual measurement application. As noted above, the visual measurement utilized by a SLAM application 635 can optionally be a relative pose estimate that is determined relative to a landmark pose associated with a landmark identified within the landmark database 650. In embodiments, the SLAM application 635 uses the relative pose and odometry data and/or mouse sensor drift data to update the location estimate of the robot 10 relative to the map of landmarks. The mobile robot 10 updates a location estimate utilizing any of a variety of SLAM including (but not limited to) the processes described in U.S. Patent Publication 2012/0121161, entitled "Systems and Methods for VSLAM Optimization", published May 17, 2013, and U.S. Patent Publication 2011/0167574, entitled "Methods and Systems for Complete Coverage of a Surface By An Autonomous Robot", published Jul. 14, 2011, the relevant disclosures of which are hereby incorporated by reference in their entirety. The SLAM application 635 can then update the map of landmarks 640 based upon the newly estimated location of the mobile robot 10.

The map of landmarks 640 includes a map of the environment surrounding the mobile robot 10 and the position of landmarks relative to the location of the mobile robot within the environment. The map of landmarks 640 may include various pieces of information describing each landmark in the map, including (but not limited to) references to data describing the landmarks within the landmark database.

The behavioral control application 630 controls the actuation of different behaviors of the mobile robot 10 based on the surrounding environment and the state of the mobile robot 10. In some embodiments, as images are captured and analyzed by the SLAM application 635, the behavioral control application 645 determines how the mobile robot 10 should behave based on the understanding of the environment surrounding the mobile robot 10. The behavioral control application 645 may select from a number of different behaviors based on the particular characteristics of the environment and/or the state of the mobile robot 10. The behaviors may include, but are not limited to, a wall following behavior, an obstacle avoidance behavior, an escape behavior, among many other primitive behaviors that may be actuated by the mobile robot 10.

In several embodiments, the input/output interface 620 provides devices such as (but not limited to) sensors with the ability to communicate with the processor and/or memory. In some embodiments, the network interface 660 provides the mobile robot 10 with the ability to communicate with remote computing devices, such as computers and smartphone devices, via a wired and/or wireless data connection. Although various robot controller 605 architectures are illustrated in FIG. 6, any of a variety of architectures including architectures where the robot behavioral controller application 645 is located in non-volatile solid state memory or some other form of storage and is loaded into memory at runtime and/or where the robot behavioral controller application is implemented using a variety of software, hardware, and/or firmware can be utilized in the implementation of the robot controller circuit 605. The conceptual operation of the mobile robots 10, when configured by a robot controller similar to the robot controller circuit 605 described above is discussed further below.

Mobile Robot Behavioral Control Systems

The mobile robot 10 may include behavioral control applications 710 used to determine the mobile robot's behavior based upon the surrounding environment and/or the state of the mobile robot. The mobile robot 10 can include one or more behaviors that are activated by specific sensor inputs and an arbitrator determines which behaviors should be activated. Inputs can include images of the environment surrounding the mobile robot 10 and behaviors can be activated in response to characteristics of the environment ascertained from one or more captured images.

Figure 7:
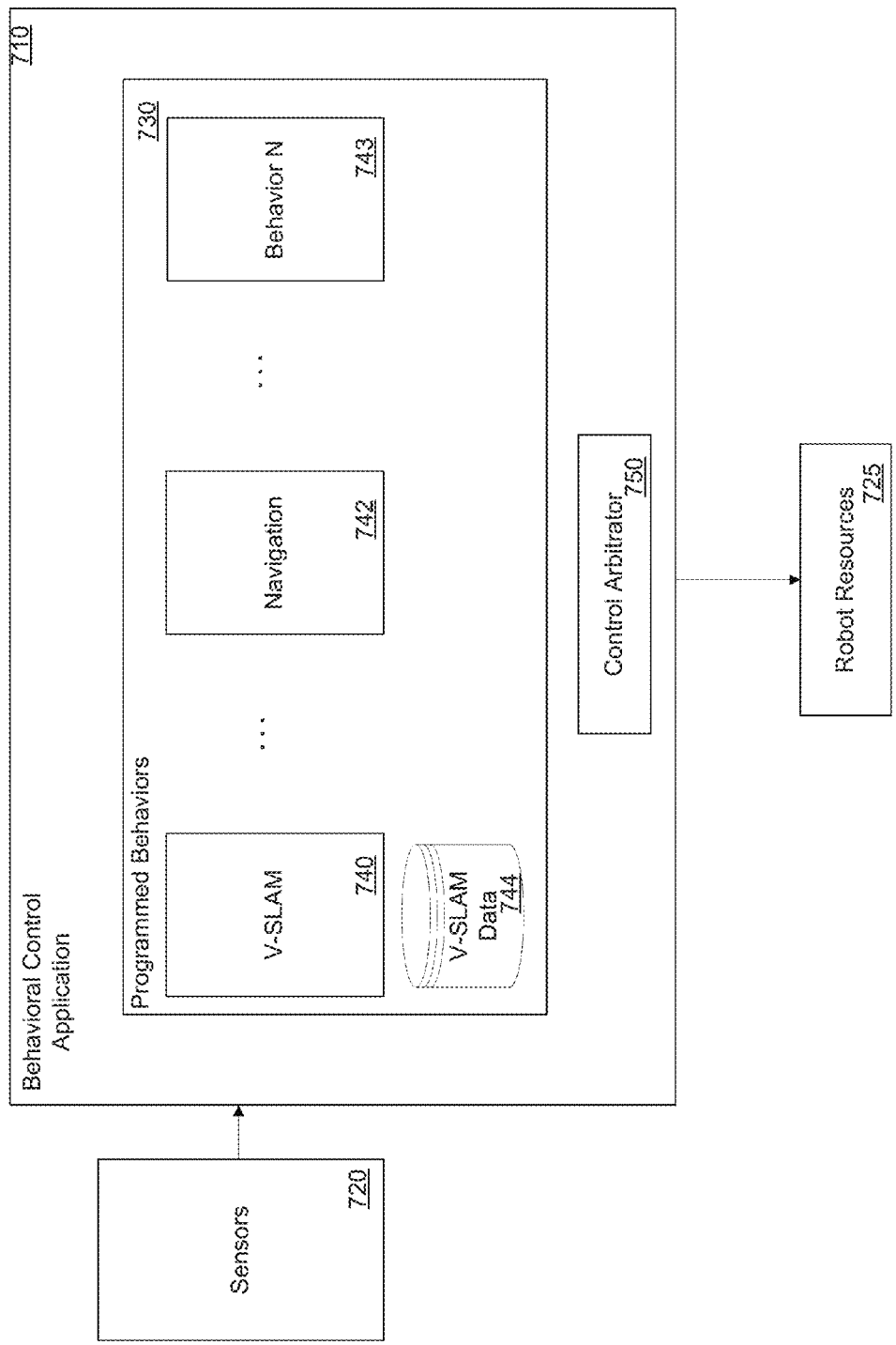
FIG. 7 conceptually illustrates a mobile robot behavioral control application configured to enable navigation within an environment based upon (but not limited to) a VSLAM process.

A mobile robot behavioral control application 710 configured to enable navigation within an environment based upon (but not limited to) a VSLAM process is conceptually illustrated in FIG. 7. The mobile robot behavioral control application 710 can receive information regarding its surrounding environment from one or more sensors 720 (e.g., machine vision system, bump, proximity, wall, stasis, and/or cliff sensors) carried by the mobile robot 10. The mobile robot behavioral control application 710 can control the utilization of robot resources 725 (e.g., the wheel modules) in response to information received from the sensors 760, causing the mobile robot 10 to actuate behaviors, which may be based on the surrounding environment. For example, when the mobile robot 10 is used to clean an environment, the mobile robot behavioral control application 710 may receive images from a navigation system 120 and direct the mobile robot 10 to navigate through the environment while avoiding obstacles and clutter being detected within the images. The mobile robot behavioral control application 710 can be implemented using one or more processors in communication with memory containing non-transitory machine readable instructions that configure the processor(s) to implement programmed behaviors 730 and a control arbitrator 750.

The programmed behaviors 730 can include various modules that may be used to actuate different behaviors of the mobile robot 10. In particular, the programmed behaviors 730 may include a VSLAM module 740 and corresponding VSLAM database 744, a navigation module 742, and a number of additional behavior modules 743.

The VSLAM module 740 manages the mapping of the environment in which the mobile robot 10 operates and the localization of the mobile robot with respect to the mapping. The VSLAM module 740 can store data regarding the mapping of the environment in the VSLAM database 744. The data may include a map of the environment and characteristics of different regions of the map including, for example, regions that contain obstacles, other regions that contain traversable floor, regions that have been traversed, frontiers to regions that have not yet been traversed, the date and time of the information describing a specific region, and/or additional information that may be appropriate to the requirements of a specific application. In many instances, the VSLAM database 744 also includes information regarding the boundaries of the environment, including the location of stairs, walls, and/or doors. As can readily be appreciated, many other types of data may optionally be stored and utilized by the VSLAM module 740 in order to map the operating environment of the mobile robot 10. Where the VSLAM module 740 performs visual measurements and uses the visual measurements to provide relative poses as inputs to a SLAM module, the VSLAM database 744 can include a landmarks database similar to the landmarks database 650 described above.

The navigation module 742 actuates the manner in which the mobile robot 10 is to navigate through an environment based on the characteristics of the environment. For example, in implementations, the navigation module 742 may direct the mobile robot 10 to change directions, drive at a speed of approximately 306 mm per second and then slow down upon approaching an obstacle, drive in a certain manner (e.g., wiggling manner to scrub floors, or a pushing against a wall manner to clean sidewalks), or navigate to a home charging station.

Other behaviors 743 may also be specified for controlling the behavior of the mobile robot 10. Furthermore, to make behaviors 740-743 more powerful, it is possible to arbitrate between and/or chain the output of multiple behaviors together into the input of another behavior module to provide complex combination functions. The behaviors 740-743 are intended to implement manageable portions of the total cognizance of the mobile robot 10.

Referring again to FIG. 7, the control arbitrator 750 facilitates allowing modules 740-743 of the programmed behaviors 730 to each control the mobile robot 10 without needing to know about any other behaviors. In other words, the control arbitrator 750 provides a simple prioritized control mechanism between the programmed behaviors 730 and resources 725 of the robot. The control arbitrator 750 may access behaviors 740-743 of the programmed behaviors 730 and control access to the robot resources 760 among the behaviors 740-743 at run-time. The control arbitrator 750 determines which module 740-743 has control of the robot resources 760 as required by that module (e.g. a priority hierarchy among the modules). Behaviors 740-743 can start and stop dynamically and run completely independently of each other. The programmed behaviors 730 also allow for complex behaviors that can be combined together to assist each other.

The robot resources 760 may be a network of functional modules (e.g., actuators, drives, and groups thereof) with one or more hardware controllers. The commands of the control arbiter 750 are typically specific to the resource to carry out a given action. The specific resources with which the mobile robot 10 is configured typically depends upon the requirements of the specific application to which the mobile robot 10 is adapted.

Although specific robot controllers and behavioral control applications are described above with respect to FIGS. 6-7, any of a variety of robot controllers can optionally be utilized within the mobile robot 10 including controllers that do not rely upon a behavioral based control paradigm. Referring again to FIGS. 1-4, the mobile robot 10 includes a navigation system 120 that can include one or more tilted cameras 125. The manner in which the mobile robot 10 can optionally perform VSLAM processes in furtherance of its programmed behaviors using input images captured by the tilted camera(s) 125 is discussed further below.

VSLAM Overview

Figure 8:
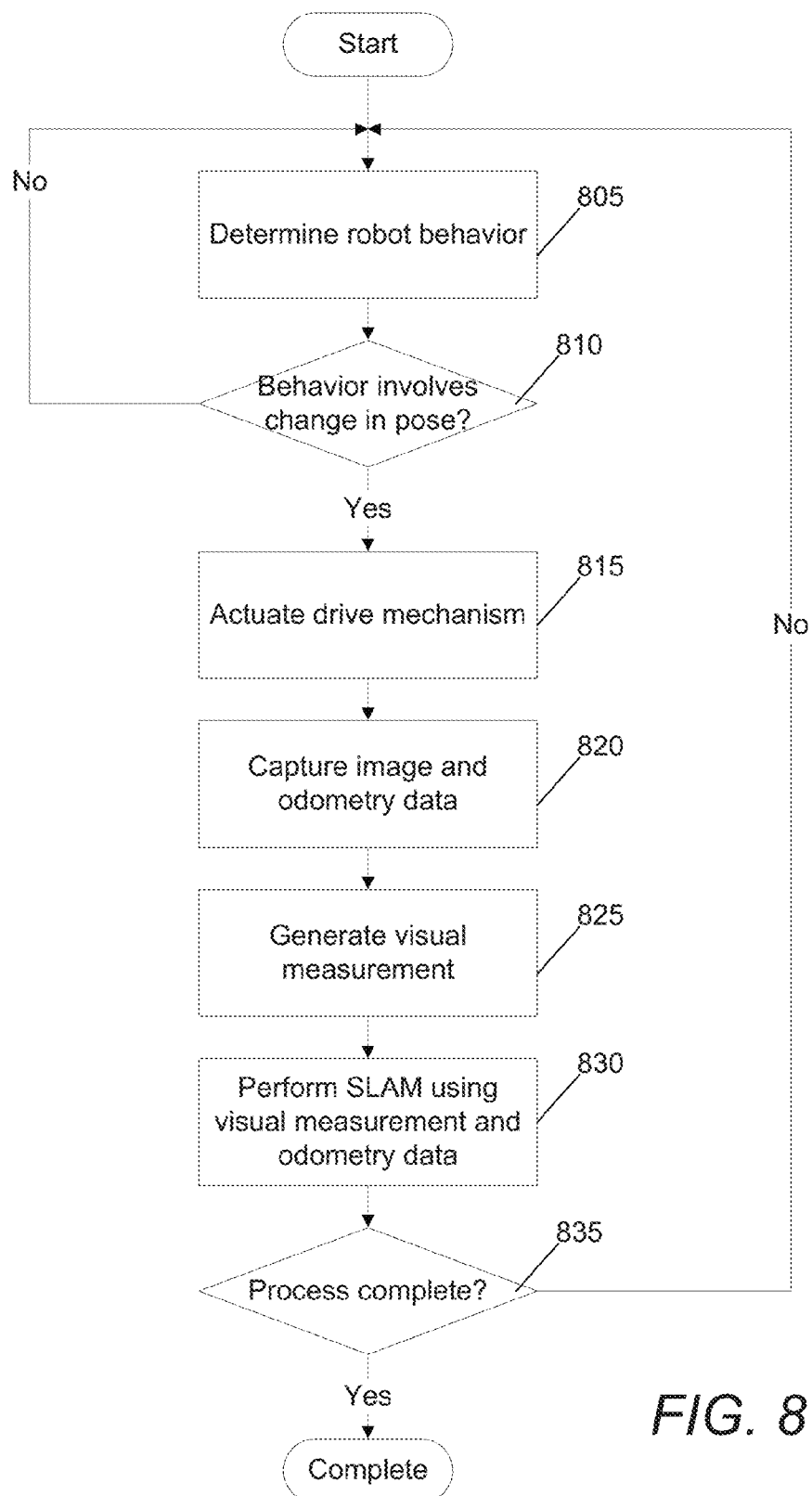
FIG. 8 is a flow chart illustrating a process that can optionally be used by a mobile robot to navigate an environment.

The mobile robot 10 can continuously detect and process information from various on board sensors in order to navigate through an environment. A process 800 that can optionally be used by the mobile robot 10 to navigate an environment is illustrated in FIG. 8. The process determines (805) a robot behavior. The robot behavior may be determined by a robot controller circuit 605 based on various factors, including the particular characteristics of the environment surrounding the mobile robot 10, the current state of the mobile robot 10, the particular operation being executed by the mobile robot, and the state of the power source used by the mobile robot 10, among various other considerations. The mobile robot 10 determines (810) whether the behavior involves a change in a pose of the robot 10. When the mobile robot 10 determines that no change in pose is required, the process completes the behavior and determines a new behavior (805). Otherwise the process actuates (815) the drive 111 of the mobile robot 10. In some embodiments, the drive 111 uses two or more wheels 113*a*, 113*b* to move the robot across a surface. In other embodiments, the drive 111 may use one or more rotating pads or tank like tracks that cause the mobile robot 10 to move across the surface based on the rotation of the pads or tracks along the surface.

As the mobile robot 10 moves, image and odometry data is captured (820). In one optional aspect of the invention, the mobile robot 10 captures each new image after travelling a threshold distance following capture of a prior image, such as (but not limited to) 20 cm between images. The specific distance between image captures typically depends on factors including (but not limited to) the speed of the robot 10, the field of view of the camera 125, and the real time processing capabilities of the specific mobile robot 10 configuration. In several embodiments, the odometry data is provided by one or more different types of odometers, including a wheel odometer that captures the odometry data based on the rotation of the wheels or an optical flow odometry system that obtains the odometry data by capturing images of a tracking surface and determining distance traveled, including correcting for any heading drift, based on the optical flow observed between successive images. Other embodiments may use additional odometry sensors or combinations of these sensors as appropriate to the requirements of the specific application.

Visual measurements can be generated (825) by the mobile robot 10 based on the odometry data and the captured images captured by the tilted camera 125. In some embodiments, the process 800 matches the new image to a set of landmark images stored in a landmarks database and for each match, estimates a relative pose determined relative to the landmark pose of the landmark given the 3-D structure and the feature correspondences between the new view and the landmark image.

A SLAM process can then be performed (830) using the visual measurement data and the odometry data. The mobile robot 10 can optionally maintain a map of landmarks and performs the SLAM process to estimate the location of the mobile robot 10 within this map. The SLAM process can also update the map of landmarks.

A determination (835) is made by the mobile robot 10 concerning whether the process has completed, and if so, completes. Otherwise, the process determines a new behavior (805).

The performance of a navigation process similar to the process described above with reference to FIG. 8 can be significantly enhanced by utilizing a camera 125 tilted so that its optical axis 155 forms an acute angle with the forward direction of motion of the mobile robot 10, as described above with reference to FIGS. 2A, 2B and 22. Similarly, increasing the angular resolution of the camera 125 (by utilizing a narrow field of view camera and/or increasing the resolution of the camera sensor) can increase the effectiveness of the navigation processes. The sensitivity of the mobile robot's 10 navigation processes to observed disparity and/or spatial resolution is discussed further below with reference to the measurement of 3D structure during landmark creation and the measurement of the spatial relationship of features identified within input images captured during navigation.

Landmark Creation and Landmark Based Navigation

The mobile robot 10 can utilize landmarks, which are collections of features having specific visually discernable 3D structures, to perform navigation. The mobile robot 10 creates landmarks by capturing images of an environment and observing and aggregating common features between the images. By overlapping the images and measuring the disparity between each of the features and estimating changes in pose between the capture of the images, the mobile robot 10 moving at a known speed can measure the distance to each of the features. These distances can then be utilized to determine the 3D structure of the set of features that define a landmark. As is discussed above, when some or all of the features forming the landmark are subsequently observed, knowledge of the 3D structure of the features can be utilized to estimate the relative pose of the mobile robot 10. In implementations, the mobile robot 10 can take two or more images over a distance traveled in order to localize.

Figure 9:
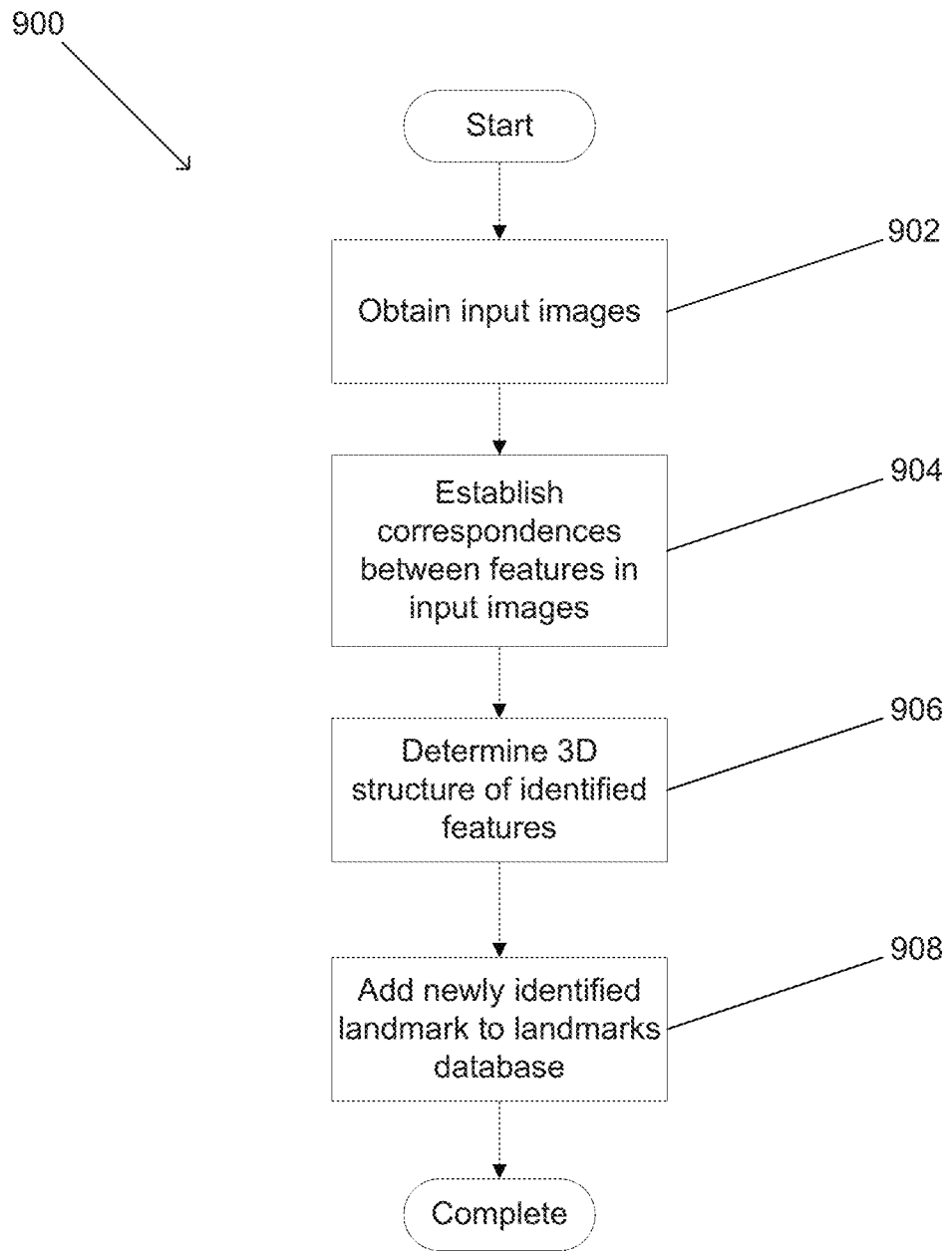
FIG. 9 is a flow chart illustrating a process that can optionally be utilized by the mobile robot to identify a new landmark for use in navigation.

A process that can optionally be utilized by the mobile robot 10 to identify a new landmark for use in navigation is illustrated in FIG. 9. The process 900 includes obtaining (902) a sequence of input images. The image sequence can include as few as two input images. Correspondences can be established (904) between features in two or more of the input images. Any of a variety of features can be utilized including (but not limited to) 2D features, 3D features, features identified using Scale-invariant Feature Transform (SIFT) descriptors, features identified using Speeded Up Robust Features (SURF) descriptors, and/or features identified using Binary Robust Independent Elementary Features (BRIEF) descriptors. In one implementation, the robot 10 uses FAST SLAM and Brief descriptors. Putative correspondences can be generated using only the feature descriptors, or by taking advantage of motion estimates provided by odometry data. The process of establishing (904) correspondences can optionally involve applying geometric constraints to eliminate features that are incorrectly identified as corresponding between the two or more input images.

The 3D structure of the identified features can then be determined (906) by minimizing the reprojection error between the locations of the observed features in each of the input images and the predicted locations given a specific estimate for the 3D structure of the identified features. Due to uncertainty in the relative poses of the mobile robot 10 when the input images were captured, the mobile robot 10 can use techniques including (but not limited to) bundle adjustment to simultaneously determine (906) the 3D structure of the identified features and estimate the relative motion of the mobile robot during capture of the input images. The mobile robot 10 can optionally use any of a variety of processes for determining structure from motion including (but not limited to) a trifocal tensor method.

Information concerning a newly identified landmark can be added (908) to the landmarks database. The mobile robot 10 can optionally associate one or more of the input images or portions of the input images and the estimate of the pose from which a specific input image was captured with a landmark in the landmarks database as landmark images and corresponding landmark poses. The mobile robot 10 can also optionally store the features and/or descriptors of the features that are associated with the landmark and a description of the 3D structure of the features. As can readily be appreciated, the specific structure of the database is typically determined based upon the requirements of a specific application and can include (but is not limited to) the use of a collection of kd-trees for performing efficient approximate nearest neighbor searches based upon observed features. The information added to the landmarks database by the mobile robot 10 can then be utilized in the determination of relative poses by the mobile robot 10 during subsequent navigation.

Figure 10:
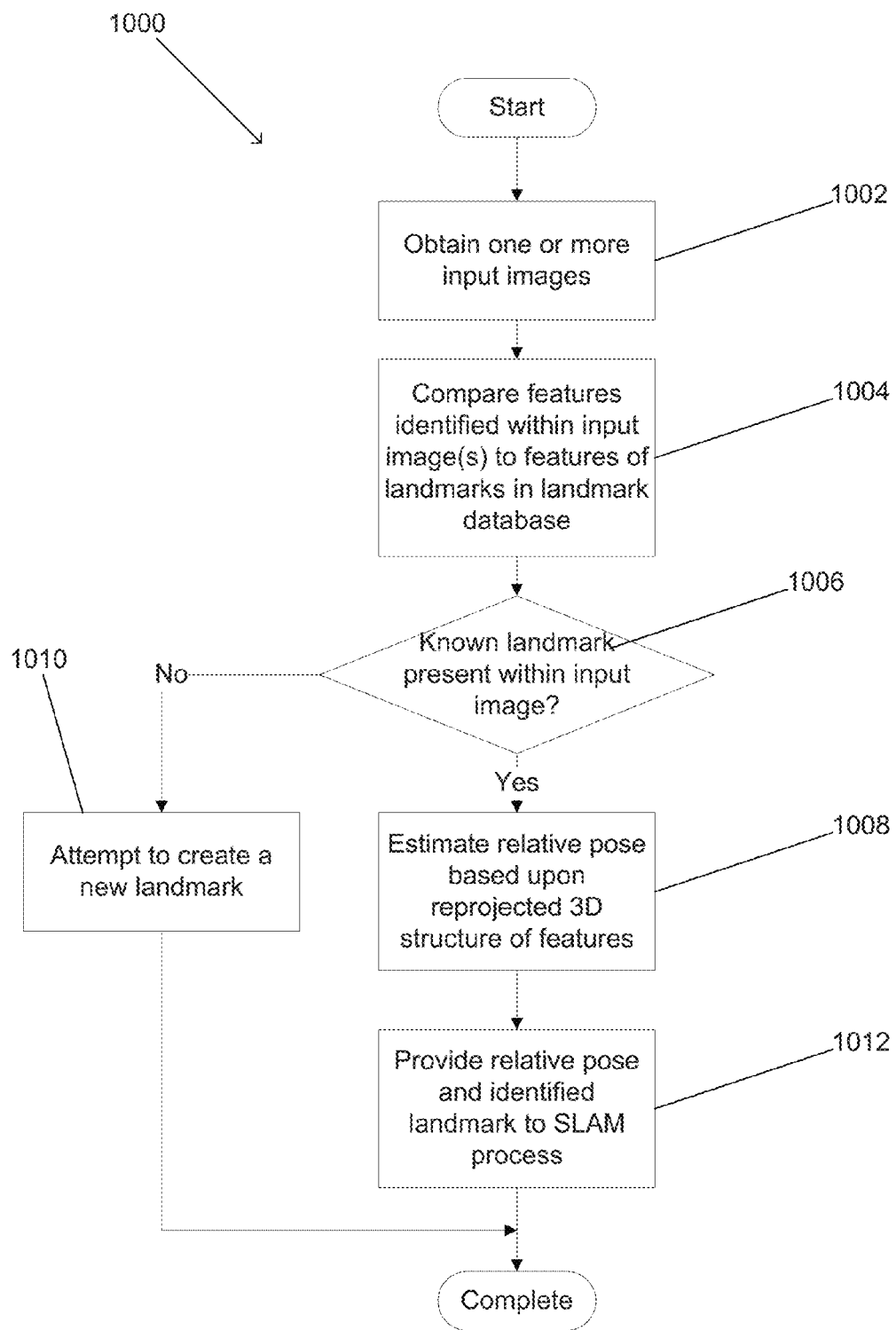
FIG. 10 is a flow chart illustrating a process that can optionally be utilized by a mobile robot to determine relative pose using previously created landmarks.

A process that can optionally be utilized by the mobile robot 10 to determine relative pose using previously created landmarks is illustrated in FIG. 10. The process 1000 includes obtaining (1002) one or more input images. The mobile robot 10 can compare (1004) features within an input image to features associated with various landmarks in the landmarks database. The process used to identify the features in the input image is typically the same process utilized to identify features during the creation of new landmarks.

When sufficient similarity exists between features in the input image and features of one or more landmarks in the landmarks database, the mobile robot 10 can determine (1006) that a known landmark from the landmark database is visible within the input image. The mobile robot 10 can then estimate (1008) the pose of the robot relative to a landmark pose associated with the landmark in the landmarks database based upon the reprojection of the 3D structure of the features of the landmark that most closely matches the spatial relationship of the features observed within the input image in which the landmark is visible. The relative pose can optionally be a description of the translation and/or rotation of the mobile robot 10 relative to the landmark pose associated with the landmark in the landmarks database. The specific manner in which the relative pose is represented is largely dependent upon the requirements of a particular application. The process of determining the most likely relative pose estimate can vary depending upon the configuration of the mobile robot 10. In one optional configuration of the mobile robot 10, a cost metric is utilized to minimize reprojection errors of the landmark features visible within an input image. In another optional configuration of the mobile robot 10, the estimation process considers likely sources of error associated with one or more of the process of estimating the 3D structure of the features forming the landmark, and/or the location of the landmark pose. In one specific configuration of the mobile robot 10, an initial estimate of relative pose is formed using reprojection of the 3D structure of the features forming the landmark and then a maximum likelihood estimation is performed assuming that the 3D structure of the features and relative pose can vary. In other configurations of the mobile robot 10, any of a variety of techniques can be utilized to determine relative pose based upon one or more of odometry data, the location of features in the images used to create the landmark, the 3D structure of the landmark, and/or the spatial relationship of the features associated with the landmark that are visible within the input image.

When the mobile robot 10 does not detect the presence of a known landmark within an input image, the mobile robot can optionally attempt to create (1010) a new landmark or may simply obtain another input image.

The mobile robot 10 can provide (1012) the identity of an identified landmark and the estimated relative pose to a SLAM process, which can determine a global pose estimate and/or update the global map of landmarks maintained by the mobile robot. As noted above, a mobile robot 10 can be optionally configured using any of a variety of SLAM processes that rely upon relative pose estimates determined relative to known landmarks as inputs. In implementations, the robot 10 uses FAST SLAM and BRIEF descriptors.

The processes described above for creating new landmarks and for navigating based upon previously created landmarks rely upon the spatial relationships that can be established using reprojection of the 3D structure of a set of features. As discussed further below with reference to FIGS. 11-16B, the alignment of the camera optical axis 155 relative to the forward direction of motion of the mobile robot 10 can play an important role in the precision with which the mobile robot can navigate. Aligning a camera 125 directly in the direction of forward motion of a mobile robot 10 can negatively impact the precision of reprojection processes. When a camera moves toward a landmark along its optical axis 155, little or no disparity is observed and the reprojection process relies upon changes in scale alone. Configuring the mobile robot 10 with at least one camera 125 tilted so that its optical axis 155 forms an angle above the forward direction of motion of the mobile robot 10 can increase observed disparity and the precision of measurements made utilizing reprojection.

An example of the field of view captured by a mobile robot 10 that has a camera 125 configured such that the optical axis 155 is aligned with the forward direction of motion of the mobile robot is illustrated in FIGS. 11A-11C. The mobile robot 10 is shown in FIG. 11A within an indoor environment. The mobile robot 10 is configured with a forward facing camera 125 having a field of view that is capturing portions of two walls 1102, 1104 that meet in a corner 1106 and various portions of the ground surface 1108 of the environment. The mobile robot 10 is shown moving toward the corner 1106 along the optical axis 155 of the camera. Successively smaller portions of the scene 1112, 1114, and 1116 are shown as captured in FIGS. 11A, 11B and 11C. Features that remain visible in each of the three views 1112, 1114, 1116 shown in FIGS. 11A, 11B, and 11C appear larger the closer the mobile robot 10 is to the corner 1106. However, little disparity is observed within the center of the field of view of the camera 125 between the successive views 1112, 1114, and 1116. The lack of disparity between views of a feature as a camera 125 moves directly toward the feature in a direction of motion along the optical axis 155 of the camera 125 is conceptually illustrated in FIG. 13A. As the camera 125 moves closer to the feature, the feature increases in size in each of three successive views 1300, 1302, 1304. However, the feature remains centered within the field of view of the camera 125. As such, distance to the feature is difficult to determine with any precision. Furthermore, features such as corners, which are typically very distinctive aids to navigation, can appear very similar at different scales. Referring again to FIGS. 11A-11C, the corner 1106 will look very similar in each of the views 1112, 1114, and 1116.

As described above with regard to FIGS. 2A, 2B and 22, tilting the camera 125 so that its optical axis 155 forms an acute angle above the direction of motion of the mobile robot 10 increases the disparity observed across the field of view of the camera. When the mobile robot 10 is configured as a house cleaning robot, the mobile robot 10 is constrained to move across a generally planar floor. Even when the floor is sloped, the mobile robot 10 does not move in a direction along the optical axis 155 of the camera 125. Therefore, translations of the mobile robot 10 result in observable disparity between different views of the scene.

Figure 12C:
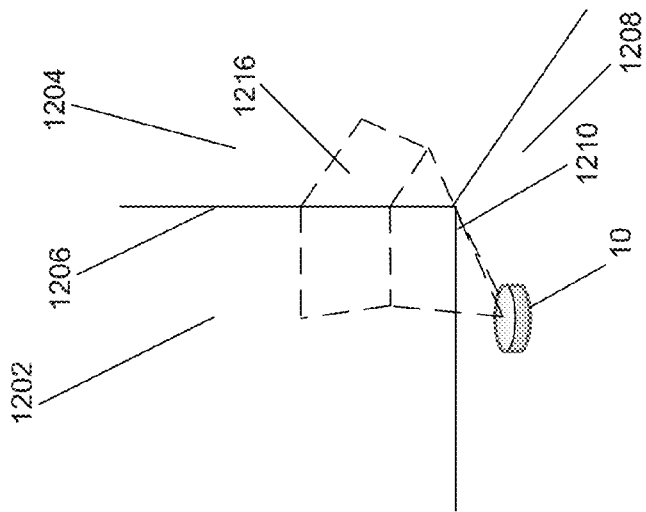
FIGS. 12A-12C illustrate an example of views of a scene captured by a camera tilted so that its optical axis forms an acute angle above the direction of motion of a mobile robot.
Figure 12B:
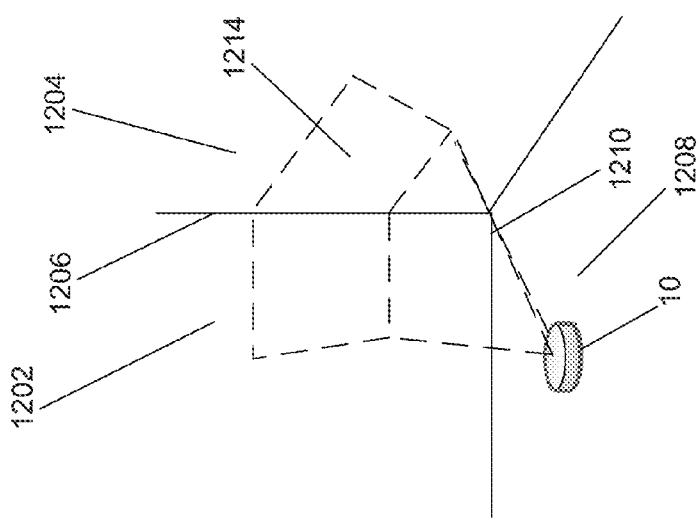
Figure 12A:
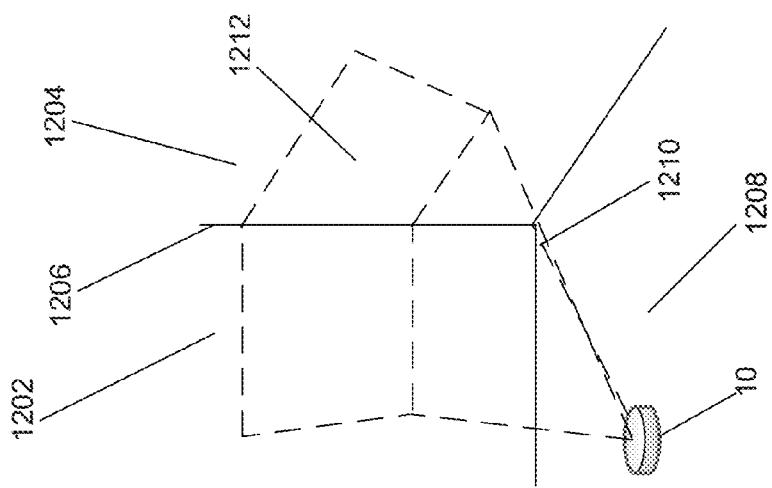
Figure 13B:
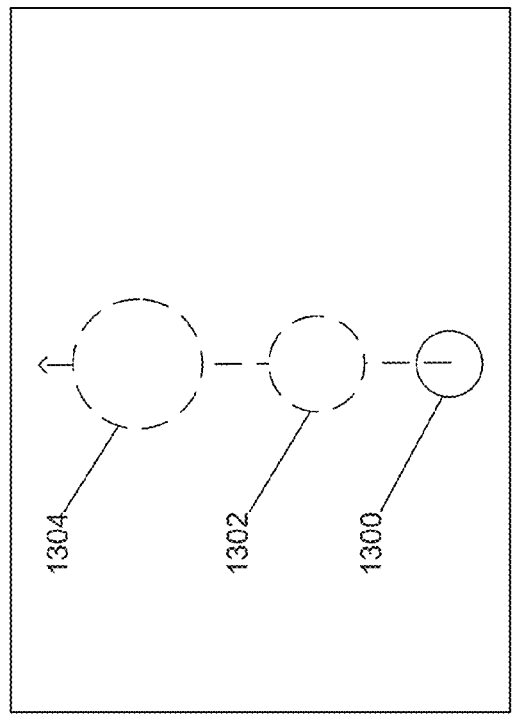
FIG. 13B illustrates an example of upward movement of features to determine disparity.
Figure 13A:
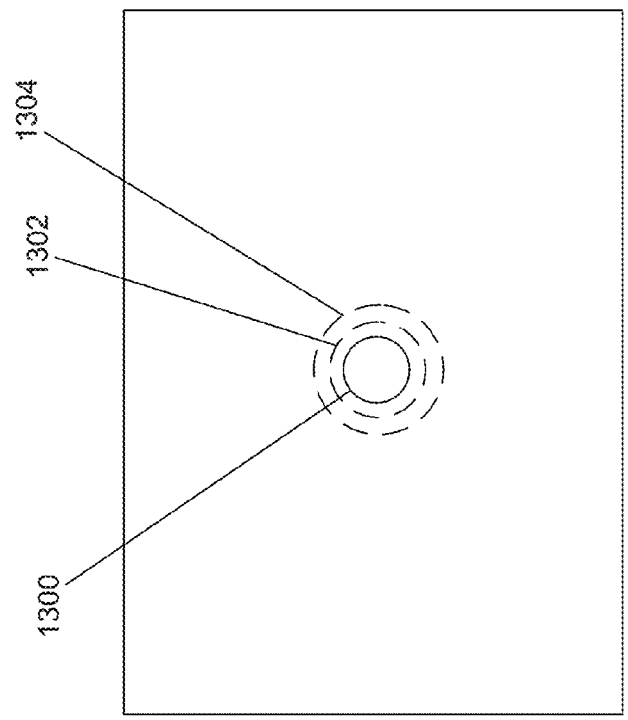
FIG. 13A illustrates disparity that can be utilized to determine distance to a feature.

An example of views of a scene captured by a camera 125 tilted so that its optical axis 155 forms an acute angle above the direction of motion of the mobile robot 10 are illustrated in FIGS. 12A-12C. The mobile robot 10 captures views of a similar scene to that shown in FIGS. 11A-11C involving two walls 1202, 1204 meeting at a corner 1206. The mobile robot 10 moves along the floor 1208 in a direction of motion 1210 toward the corner 1206. As when the mobile robot 10 is configured with a forward looking camera in the manner described above with respect to FIGS. 11A-11C, the mobile robot configured with the tilted camera 125 captures views 1212, 1214, 1216 of successively smaller portions of the scene. However, the tilt of the camera 125 results in the field of view of the camera in each of the successive views shifting lower down the walls 1202, 1204. Therefore, features visible in each of the three views appear to move upward between successive views 1212, 1214, 1216. The upward movement of features is conceptually illustrated in FIG. 13B. As the mobile robot 10 moves along the floor in a direction toward a feature, the feature increases in size and moves progressively upward in each of three successive views 1310, 1312, 1314.

To illustrate the observable disparity, the three successive views 1310, 1312, 1314 are superimposed. When features do not lie on the exact centerline of the field of view of the camera 125, the features will move up and away from the centerline of the field of view of the camera. As can readily be appreciated, the presence of significant disparity can be utilized to determine distance to a feature with much greater precision than can be made from the feature observed in the successive views 1300, 1302, 1304 illustrated in FIG. 13A. When considered across a group of features, the increased disparity provides more information concerning the 3D structure of a set of features forming a landmark. For example, if a set of features corresponds to an object in the environment with a 3D structure such as a door frame, rather than just a circle on the wall, then as the mobile robot 10 moves closer to the door frame, it will be able to ascertain the 3D structure of the doorframe with higher precision. As noted above, the precision with which the 3D structure of a landmark is determined significantly impacts the precision of relative pose estimates made using the landmark during subsequent navigation. The tilt of the camera 125 can also enable the mobile robot 10 to see more of the underside of objects. Many of the objects relied upon for navigation by mobile robots 10 configured as housecleaning objects are relatively flat objects hung or mounted to walls such as (but not limited to) picture frames, flat screen televisions, and speaker systems. Tilting the camera 125 increases the portion of the field of view of the camera devoted to imaging the underside of such objects. Accordingly, the 3D structure of the underside of the objects can be determined more precisely resulting in more precise subsequent navigation based upon the 3D structure of the landmark.

The impact of increasing observable disparity when determining the 3D structure of a landmark and estimating relative pose is illustrated by a series of simulations described below with reference to FIGS. 14A, 14B, and 15. The simulations involved simulating the precision with which a mobile robot 10 moving toward a corner of a room can determine its relative pose using a forward looking camera compared with the precision achieved using a camera tilted so that the optical axis of the camera 125 forms an acute angle above the direction of motion of the mobile robot 10.

Figure 14A:
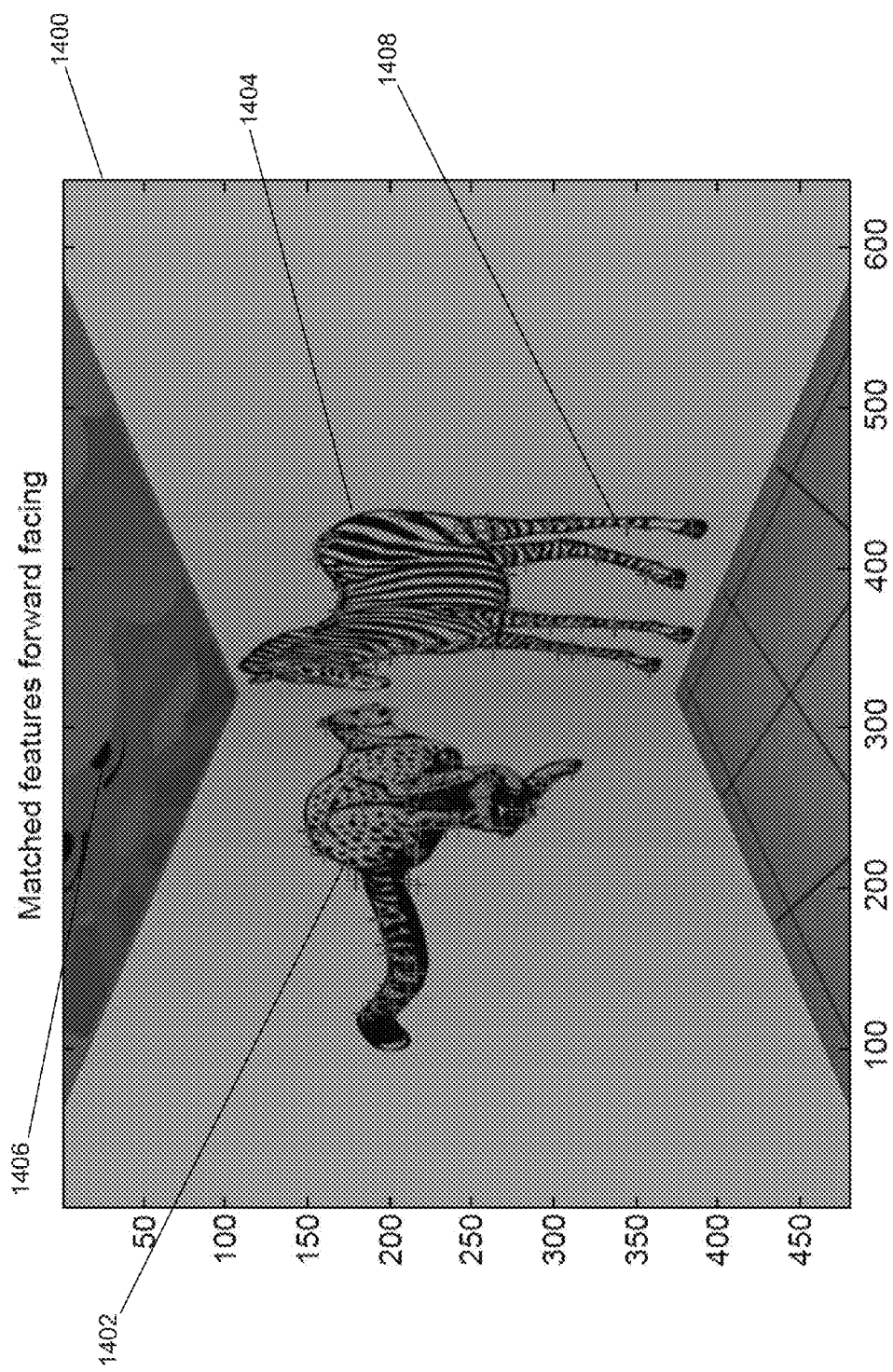
FIG. 14A illustrates an image generated by simulating a viewpoint of a forward facing camera of a simulated mobile robot in a virtual indoor environment
Figure 14B:
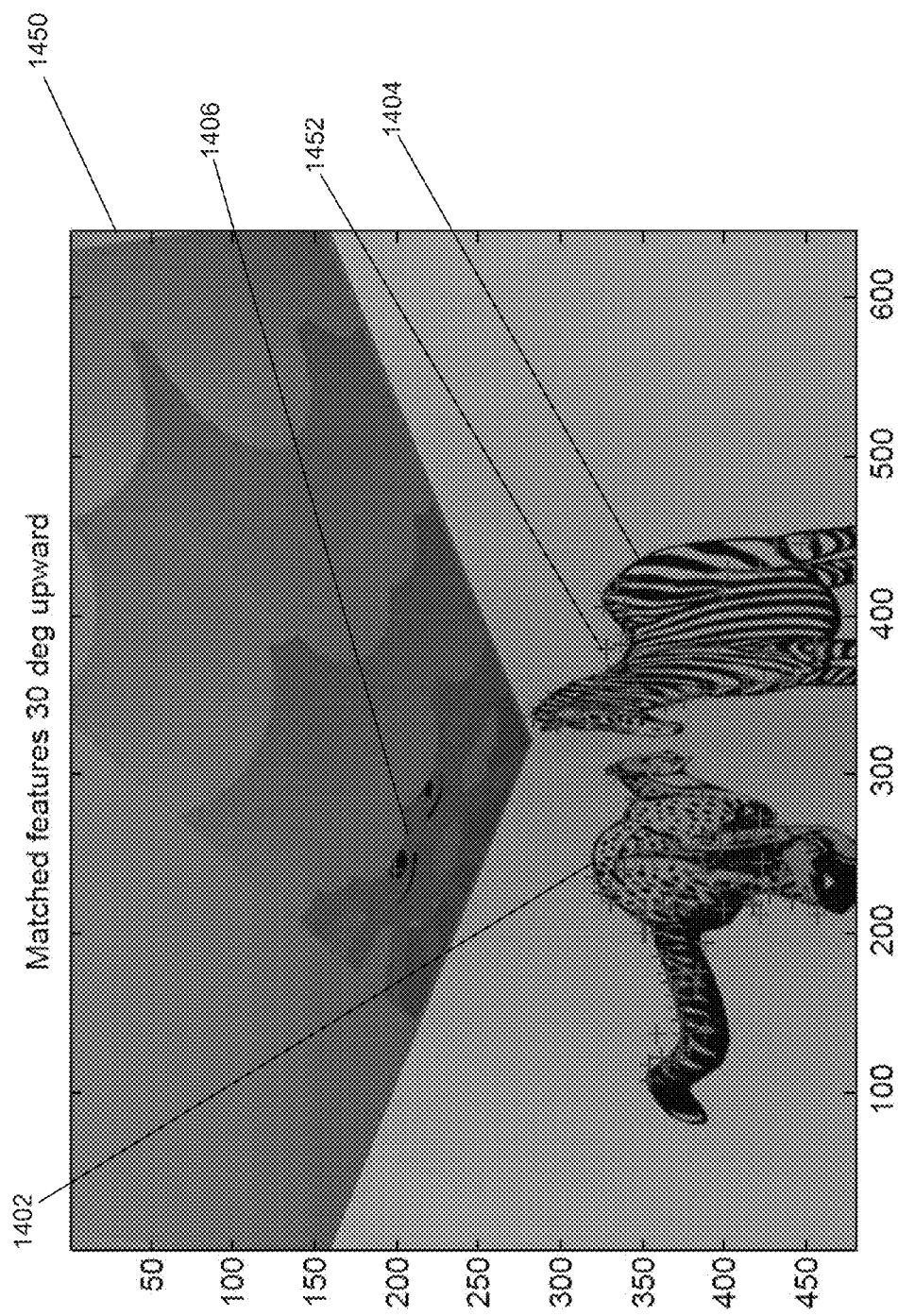
FIG. 14B illustrates an image generated by simulating a viewpoint of a camera having the same field of view as the camera used in the simulation used to generate the image shown in FIG. 14A with the exception that the camera is tilted so that the optical axis of the camera is at a 30 degree angle above the direction of forward motion of the simulated mobile robot

FIG. 14A is an image 1400 generated by simulating a viewpoint of a forward facing camera of a simulated mobile robot in a virtual indoor environment. The virtual indoor environment is a room that includes texture on its walls and ceiling in the form of an image of a cheetah 1402 and an image of a zebra 1404 on two walls forming a corner and an image of a sunrise 1406 on the ceiling of the virtual room. In the simulation, the virtual room is dimensioned as a 4 unit by 4 unit room with 2 unit high walls. The simulated mobile robot camera is 1 unit above the floor and the forward looking camera is pointed at a corner. In the simulation, the mobile robot determines shift in relative pose based upon comparisons of features identified in images obtained after moving 0.5 units forward toward the corner. The features identified by the simulated mobile robot using processes similar to those described above are illustrated as a plurality of crosses 1408. FIG. 14B is an image 1450 generated by simulating a viewpoint of a camera having the same field of view as the camera used in the simulation used to generate the image 1400 shown in FIG. 14A with the exception that the camera is tilted so that the optical axis of the camera is at a 30 degree angle above the direction of forward motion of the simulated mobile robot. The features identified by the simulated mobile robot and used to perform localization are illustrated as a plurality of crosses 1452.

Figure 15:
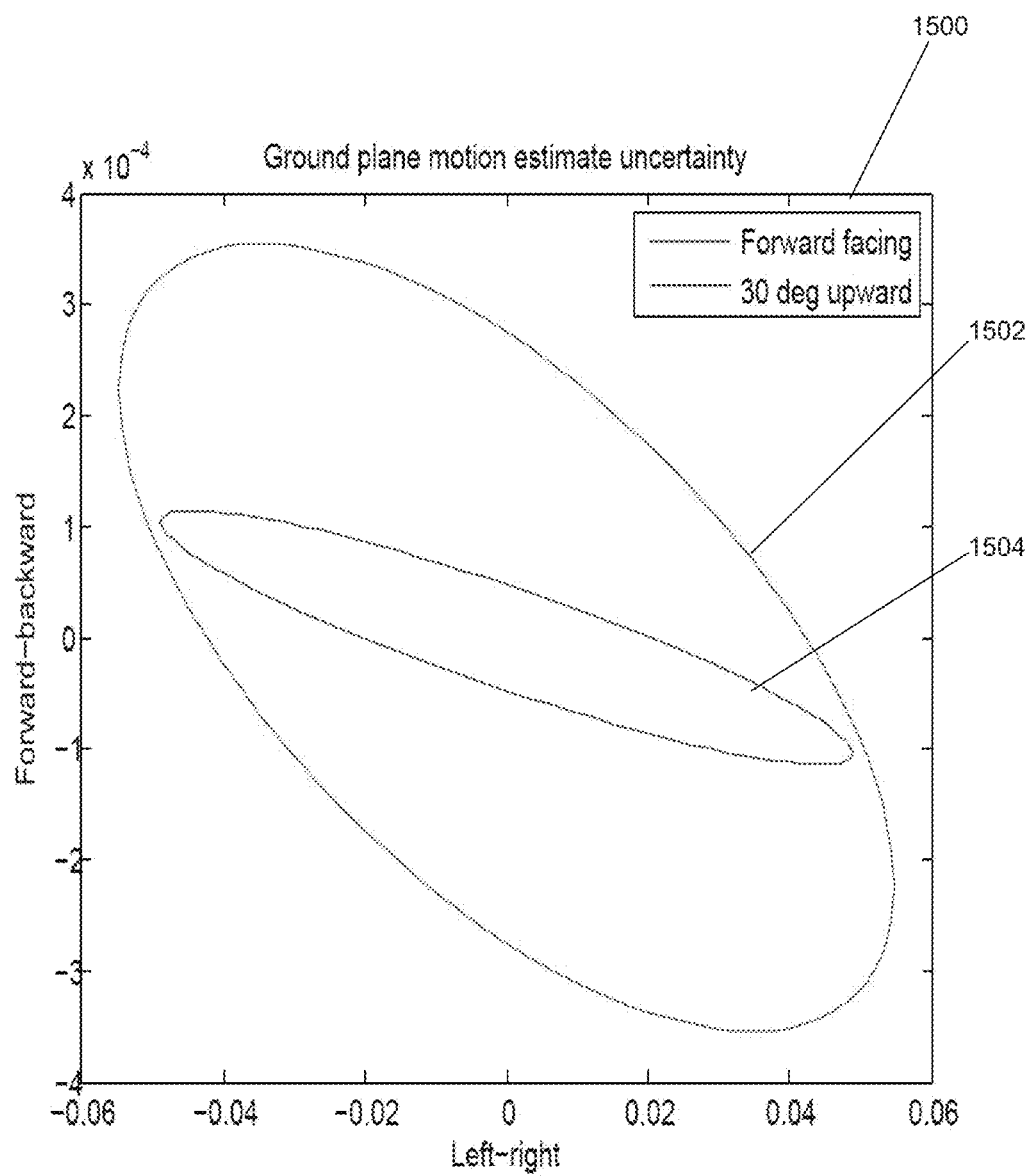
FIG. 15 is a chart showing a comparison of the precisions with which a mobile robot is able to determine its relative pose in the floor plane in each of the simulations described above.

FIG. 15 is a chart showing a comparison of the precisions with which the mobile robot is able to determine its relative pose in the floor plane in each of the simulations described above. The chart 1500 illustrates the uncertainty 1502 in the relative pose determined using a simulated mobile robot with a forward facing camera and the uncertainty 1504 in the relative pose determined using a simulated mobile robot with a camera tilted so that the optical axis of the camera is at a 30 degree angle above the direction of motion of the mobile robot. As noted above, the simulations involved the simulated mobile robot moving 0.5 units toward the corner of the virtual room. Uncertainty is expressed in terms of error to the left or right of the true location of the simulated mobile robot and in front of or behind the true location of simulated mobile robot defined relative to the forward direction of motion. The left-right uncertainty can be considered uncertainty in a dimension perpendicular to the direction of motion and the forward-backward uncertainty can be considered uncertainty in a dimensional parallel to the direction of motion. As can be appreciated by reviewing FIG. 15, use of a camera tilted so that the optical axis of the camera is at a 30 degree angle above the direction of motion of the mobile robot achieves a reduction in uncertainty relative to a forward facing camera in both dimensions. The reduction in uncertainty in the dimension perpendicular to the direction of motion is slight, however, a significant reduction in uncertainty is achieved in the dimension along the direction of motion.

While the simulations described above compare a forward facing camera and a camera tilted so that its optical axis at a 30 degree angle above the direction of motion of the mobile robot, similar reductions in location uncertainty can be achieved using cameras tilted so that the optical axes of the cameras are aligned at other acute angles above the direction of motion of the mobile robot. Furthermore, although the benefits of using a tilted camera 125 to increase disparity observed in successive images captured by the camera using processes for creating landmarks and determining relative pose based upon landmarks are described above with reference to FIGS. 9 and 10, similar benefits can be obtained by utilizing one or more tilted cameras 125 to capture images of a scene using the mobile robot 10 configured using any of a variety of optional VSLAM navigation processes.

Cameras employing wide angle lenses are typically utilized in mobile robots configured to perform VSLAM and CV-SLAM. A significant benefit of using a tilted camera 125 is that features observed within the center of the field of view of the camera can be utilized to obtain precise depth estimates. As is discussed further below, the precision with which the mobile robot 10 can determine the 3D structure of landmarks can be further increased by utilizing a tilted camera 125 configured with a narrow field of view lens 140 having increased angular resolution relative a camera employing a sensor with the same resolution and a wider field of view lens.

Increasing Navigation Precision with Increased Angular Resolution

Configuring the mobile robot 10 with a tilted camera 125 having a narrow field of view and increased angular resolution can increase the precision with which the mobile robot 10 can determine the 3D structure of landmarks and the precision of relative pose estimates determined based upon the reprojection of the 3D structure of the landmarks. Furthermore, the use of narrow field of view lenses can enable the mobile robot 10 to perform image processing without the computational expense (e.g., time, processing power, etc.) of rectifying the images acquired by the camera 125. As can readily be appreciated, decreasing processing load can enable the mobile robot 10 to process more images at a higher frame rate (enabling the mobile robot to move faster), decrease power consumption (increasing battery life), and/or provide the mobile robot 10 with additional processing capacity to perform other functions.

Figure 16A:
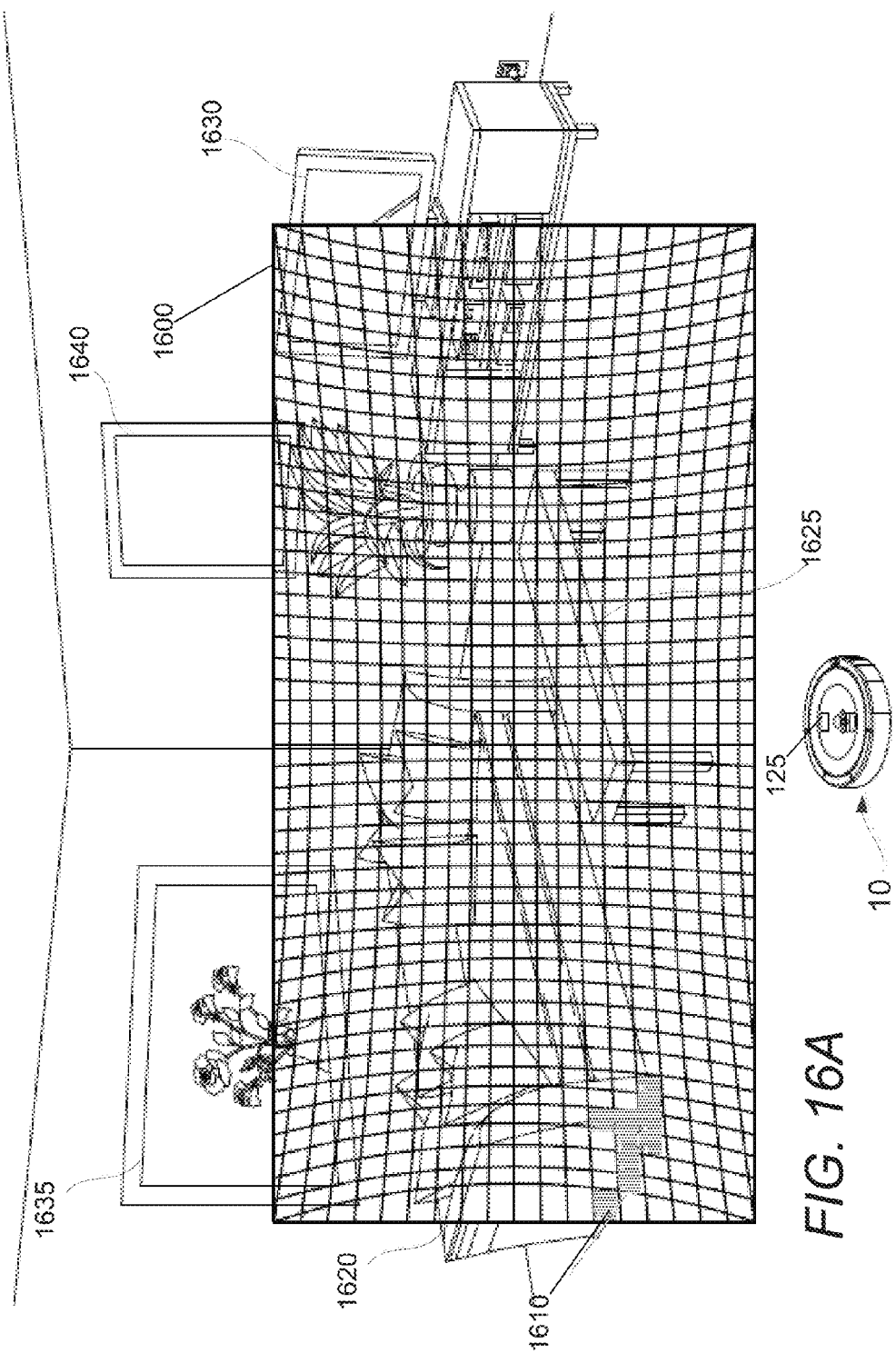
FIG. 16A illustrates a sampling grid of a camera of a mobile robot configured using a wide angle lens.
Figure 16B:
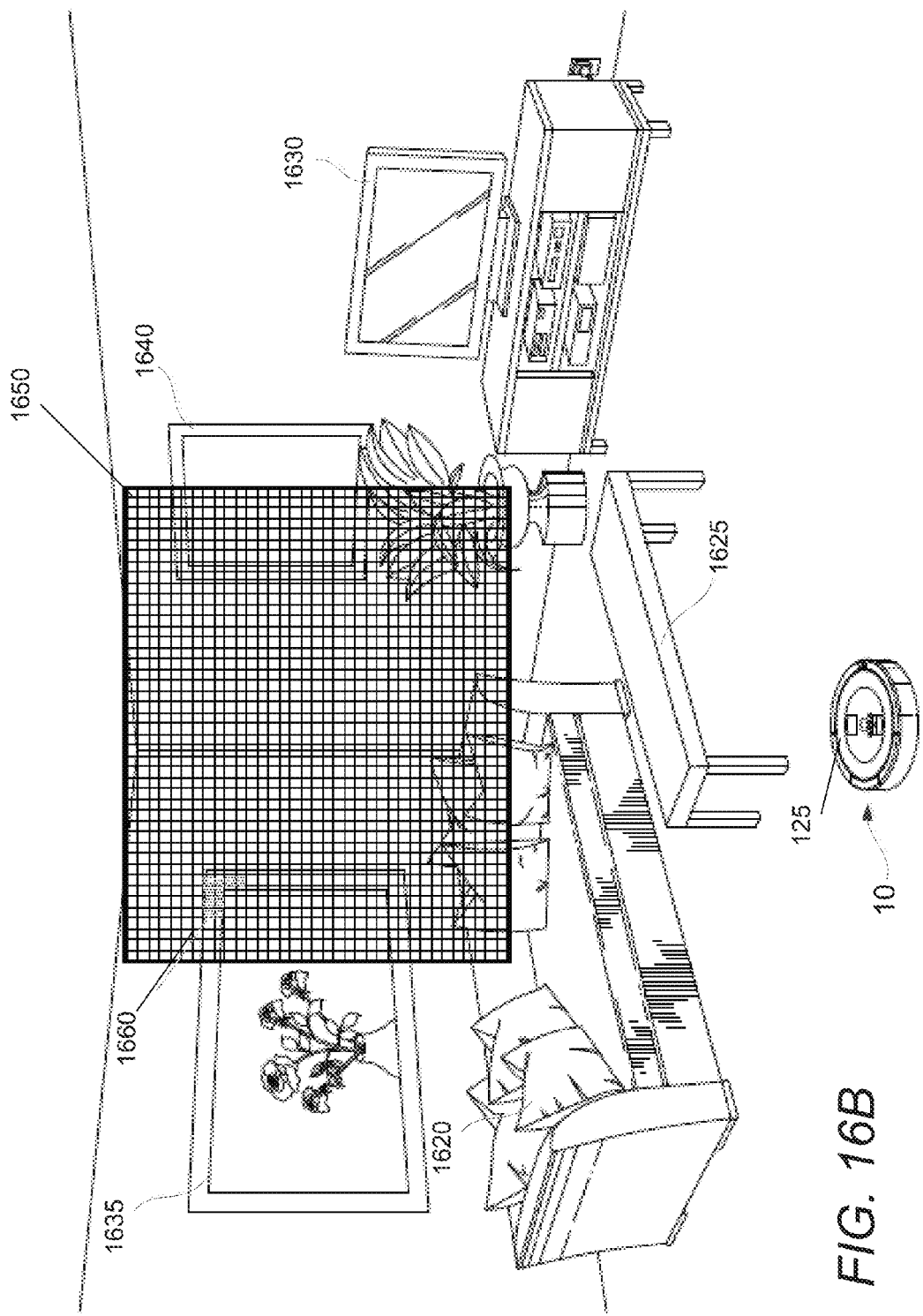
FIG. 16B illustrates sampling a scene using a tilted camera having a narrow field of view.

FIGS. 16A and 16B illustrate the increase in precision with which landmarks can be located when the mobile robot 10 is configured using a tilted camera 125 with a narrow field of view as compared to when the mobile robot is configured using a forward looking camera having a comparatively wider field of view. FIG. 16A illustrates the sampling grid 1600 of the camera 125 of the mobile robot 10 configured using a wide angle lens. The sampling grid 1600 conceptually illustrates the portions of the scene sampled by each pixel in the directly forward looking camera 125. In real world applications, the mobile robot 10 is typically configured with a much higher resolution camera. However, a very low resolution sampling grid is utilized to illustrate the impact of angular resolution and distortion on subsequent image processing. The sampling grid 1600 samples a scene, which is a typical living room including a couch 1620, coffee table 1625, television 1630, framed picture 1635 and window 1640. When the mobile robot 10 moves in a direction along the optical axis 155 of the camera 125, very little disparity is observed within the central portion of the field of view of the camera and the most reliable depth estimates of 3D structure are obtained from features at the periphery of the field of view of the camera 125. The distortion introduced by the wide angle lens is conceptually illustrated as curved lines within the sampling grid 1600. Due to distortion, the angular resolution of the camera 125 is lower at the periphery of the field of view of the camera compared to the angular resolution of the camera at the center of the field of view of the camera. The lower angular resolution is depicted as greater separation between the vertices within the sampling grid 1600. Therefore, features observed within the periphery of the field of view of the camera 125 are observed with comparatively low precision. A feature that could be used in navigation is the front corner of the couch. Shading 1610 is used to indicate a grouping of pixels that may be indicative of the landmark. As can be seen by comparison with FIG. 16B (discussed below), the comparatively lower resolution means that significant shifts and rotations of the sampling grid 1600 can occur before the feature is observed using a different set of pixels. Accordingly, the precision of localization of the mobile robot 10 is comparatively much lower.

By contrast, the mobile robot 10 illustrated in FIG. 16B samples the scene using a tilted camera 125 having a narrow field of view. Due to the camera 125 tilt, the mobile robot 10 is able to precisely determine the 3D structure of features across the field of view of the camera. Narrowing the field of view of the camera 125 significantly increases the angular resolution of the camera relative to the angular resolution of the camera illustrated in FIG. 16A. The sampling grid 1650 of the mobile robot 10 illustrated in FIG. 16B samples the scene with much higher angular resolution, or sampling density. Therefore, the precision with which the location of specific features can be determined is much higher. Furthermore, the narrow field of view lens 140 introduces very little distortion. Therefore, the angular resolution does not diminish significantly across the narrower field of view, and the mobile robot 10 can process the image data without first performing rectification. The ability to measure disparity with finer precision using a narrower field of view lens can result in more precise estimation of the 3D structure of the features that form a landmark and the distance of those structural elements to the mobile robot 10 moving relative to the stationary landmarks at a known speed. In addition, the ability to measure the distance between identified features within an image more precisely can result in a more precise relative pose estimation based upon minimization of the reprojection error of the 3D structure into the new viewpoint. Accordingly, the combination of a tilted camera 125 and a narrow field of view lens 140 can result can result in much higher location precision during navigation based upon VSLAM processes. A feature that could be used in navigation is the top right corner of the picture frame 1635. Shading 1660 is used to indicate a grouping of pixels that may be indicative of the landmark. As can be seen by comparison with FIG. 16A (discussed above), the comparatively higher resolution means that small shifts and/or rotations of the sampling grid will result in this feature being observed by a different set of pixels. Accordingly, the precision of localization of the mobile robot 10 is comparatively much higher.

While different fields of view are illustrated in FIGS. 16A and 16B for the purpose of conceptually illustrating the benefits of utilizing a tilted camera 125 with a narrow field of view relative to a forward looking camera with a wide angle lens, the mobile robot 10 can be configured using a tilted camera 125 having any of a variety of fields of view. A narrow field of view lens is typically considered to be a lens in which perspective projection is generally a good approximation to the true imaging characteristics of the lens, whereas wide angle lenses introduce distortion. In one optional configuration, the tilted camera 125 is configured with a narrow field of view lens having a lens with a horizontal field of view selected from the range of 65-75 degrees and a vertical field of view selected from the range of 45-65 degrees. In implementations, the tilted camera 125 lens has a 72 degree horizontal field of view and a 50 degree vertical field of view. In another optional configuration, the titled camera 125 is configured with a narrow field of view lens having a field of view of at or between 70 and 80 degrees horizontally and 50 and 60 degrees vertically. As can readily be appreciated, the specific lens 140 and/or the specific field of view of the lens 140 utilized in the camera(s) 125 of the mobile robot 10 is largely dependent upon the requirements of a given application.

The extent of the field of view of the camera 125 utilized by the mobile robot 10 can become largely irrelevant when some or all of the field of view of the camera 125 is occluded or severely blurred. Accordingly, the mobile robot 10 can be optionally configured to detect occlusions and notify the user of the need to inspect the mobile robot 10 to attempt to disregard the occlusion from comparisons of successive images. Occlusion detection processes that can be optionally employed by the mobile robot 10 are discussed further below.

Occlusion Detection

The one or more cameras 125, 140 in the navigation system 120 of the mobile robot 10 may experience deteriorated functionality due to ongoing exposure to the elements in the environment surrounding the mobile robot 10. In particular, within an indoor environment, dust, debris, fingerprints, hair, food particles, and a variety of other objects may collect and settle on the camera lens cover(s) 135 as the mobile robot 10 cleans the environment. These obstructions may diminish the quality of images captured by the camera 125 for use in a VSLAM process and thus diminish the accuracy of the mobile robot's 10 navigation through an indoor environment. In order to maintain a sufficient level of navigation performance, the mobile robot 10 may provide a notification to a user when a determination is made that the mobile robot 10 is no longer receiving useful information from some or all of the view of at least one camera 125.

Figure 17A:
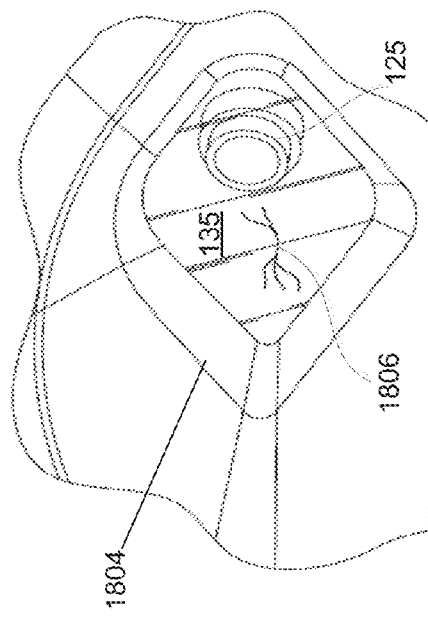
FIG. 17A illustrates examples of specific types of occlusions and the resulting images captured by the occluded camera.
Figure 17B:
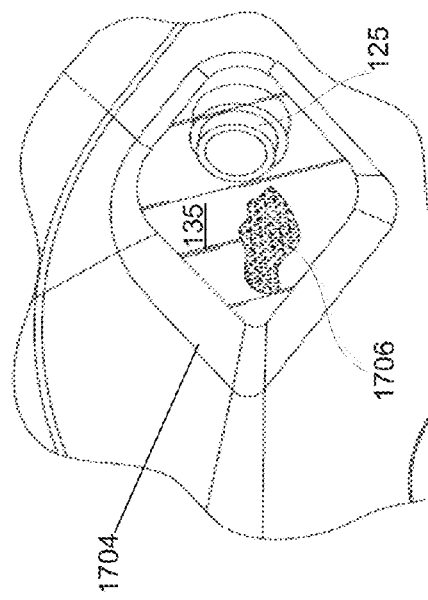
FIG. 17B illustrates an example of an image captured by a camera in which the semi-transparent occlusion results in a blurred portion of the image.
Figure 18B:
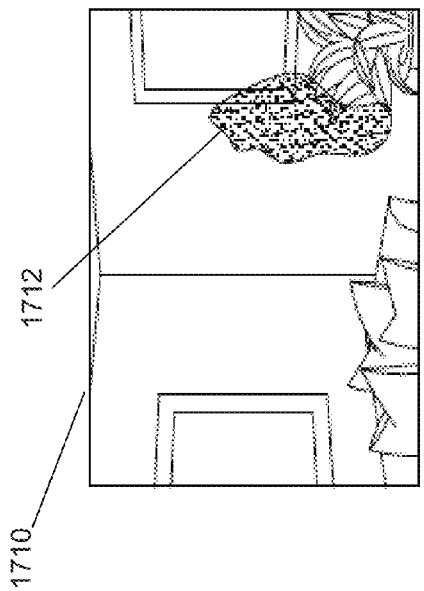
FIG. 18B illustrates an example of an image captured by a camera in which the opaque occlusion results in complete occlusion of a portion of a scene.

The manner in which a portion of the field of view of one of the cameras 125 of the mobile robot 10 can become occluded are as varied as the environments in which the mobile robot 10 can be configured to operate. When a portion of the field of view is occluded, the camera 125 may not provide any useful image data that can be used by navigation processes including (but not limited to) a VSLAM process. Examples of specific types of occlusions and the resulting images captured by the occluded camera 125 are conceptually illustrated in FIGS. 17A-18B. A semi-transparent occlusion 1706 is illustrated in FIG. 17A. The camera 125 is shown as recessed within the body 100 of the mobile robot 10 and having a lens cover 135 located within the opening 1704 of the recess. A semi-transparent occlusion 1706 (such as a finger smudge or a water droplet) is present on the lens cover 135. An image 1710 captured by the camera 125 in which the semi-transparent occlusion 1706 results in a blurred portion of the image 1712 is conceptually illustrated in FIG. 17B. As can readily be appreciated, the blurring is likely to result in a lack of feature correspondences with respect to features that would be otherwise identified within the portion of the camera field of view distorted by the semi-transparent occlusion. Therefore, the presence of the occlusion 1706 will become evident over time due to an inability of a navigation process such as (but not limited to) a visual measurement process to identify a landmark within the impacted portion of the camera field of view.

Figure 18A:
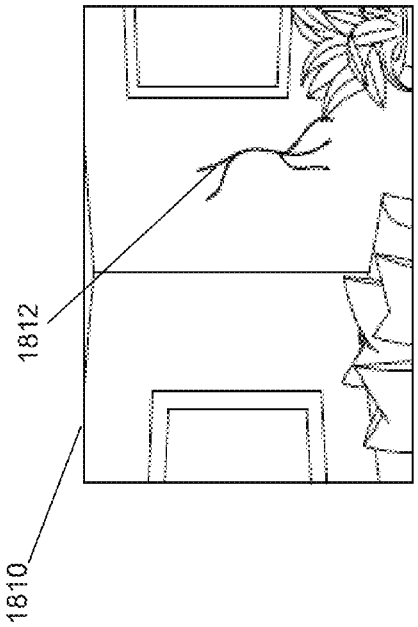
FIG. 18A illustrates an example of an opaque occlusion.

An opaque occlusion 1806 is illustrated in FIG. 18A. The camera 125 is similarly shown as recessed within the body 100 of the mobile robot 10 and having a lens cover 135 located within the opening 1804 of the recess 130. An opaque occlusion 1806 (such as a dust particle, ink droplet, or fragment of paper) is present on the lens cover 135. An image 1810 captured by the camera 125 in which the opaque occlusion 1806 results in complete occlusion of a portion of the scene 1812 is conceptually illustrated in FIG. 18B. To the extent that the mobile robot 10 detects a feature within the portion of the scene impacted by the opaque occlusion 1806, the mobile robot 10 will be unable to observe any disparity with respect to those features in successive views of the scene. The opaque occlusion 1806 typically will appear as a false landmark in the same location with the same dimensions in successive images. This lack of disparity prevents the use of any features associated with the occlusion 1806 in creation of a landmark, because the mobile robot 10 would be unable to determine any 3D structure for the landmark. Accordingly, over time the presence of the opaque occlusion 1806 will become evident over time due to an inability of a navigation process such as (but not limited to) a visual measurement process to identify a landmark within the impacted portion of the camera 125 field of view. The mobile robot 10 may optionally detect opaque occlusions 1806 more rapidly by detecting features that appear in the same location irrespective of the rotation and/or translation of the mobile robot 10.

Figure 19:
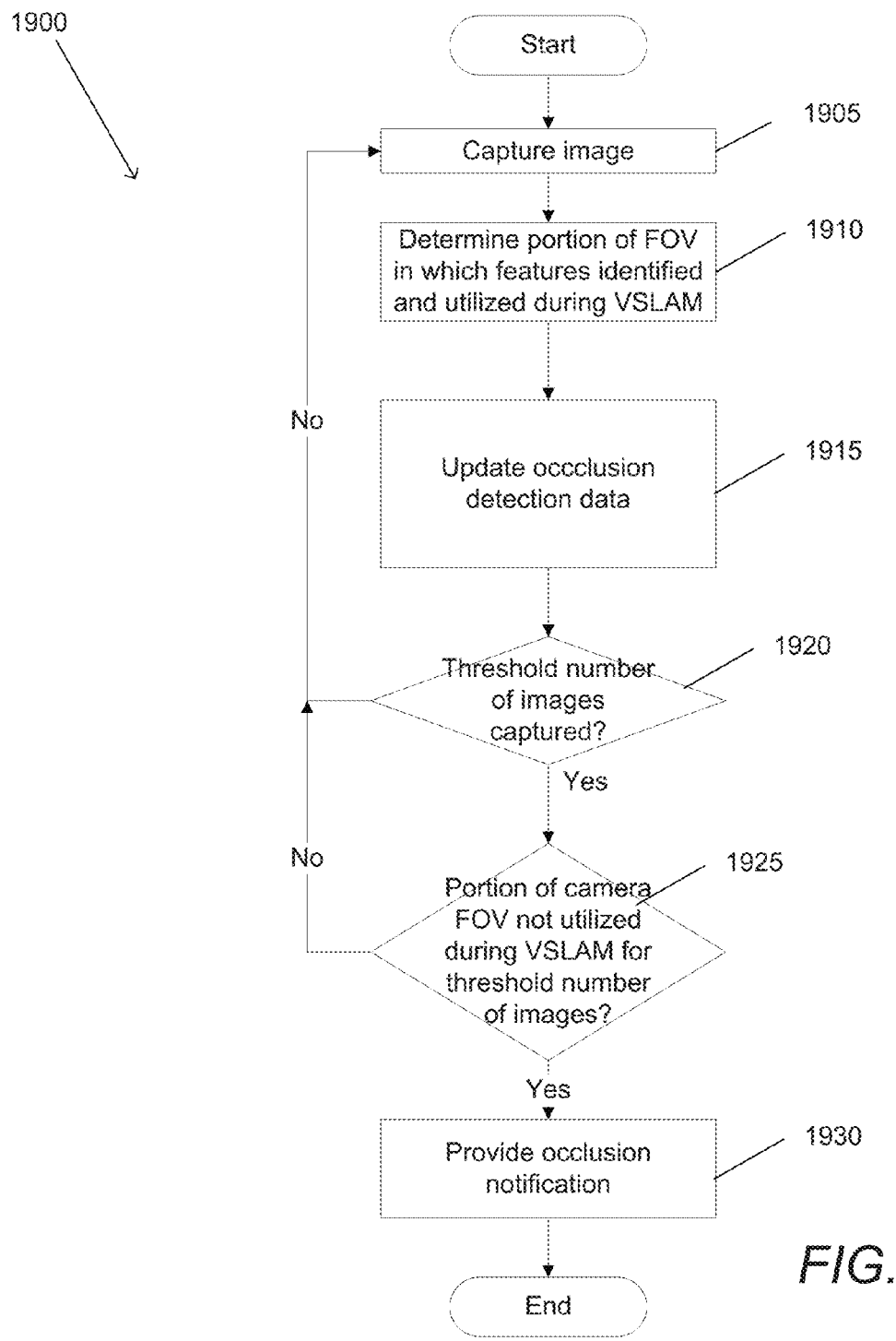
FIG. 19 is a flow chart illustrating an occlusion detection process that can optionally be performed by a mobile robot.

An occlusion detection process that can optionally be performed by the mobile robot 10 is illustrated in FIG. 19. The process 1900 includes capturing (1905) an input image for use in navigation. As noted above, the mobile robot 10 may be optionally configured using a camera 125 that is located within a recess 130 in the top cover of the body 100 of the mobile robot 10 and/or the camera 125 may be tilted so that the optical axis 155 of the camera forms an acute angle above the forward direction of motion of the mobile robot 10.

The mobile robot 10 determines (1910) the different portions of the field of view of the camera(s) 125 in which features are identified and utilized during navigation processes including (but not limited to) VSLAM processes and updates (1915) occlusion detection data accordingly. When the mobile robot 10 is configured in such a way that the navigation process performs a VSLAM process, certain portions of an image may contain features that the VSLAM process may utilize to generate landmarks for use in performing visual measurements and mapping the environment. The mobile robot 10 can collect occlusion detection data describing the portions of the images used to generate and/or detect landmarks, and these portions of the images may correspond to different portions of the camera field of view. In one optional aspect of the invention, the mobile robot 10 may maintain a histogram of the various portions of the field of view being used to identify features. When an occlusion is present, the histogram would reflect that these portions of the field of view are not being utilized by VSLAM to generate and/or detect landmarks.

The mobile robot 10 can determine (1920) whether a certain threshold number of input images have been captured. In many embodiments, the threshold number of input images may vary and the accuracy of the occlusion detection will generally increase with a larger number of input images. When a threshold number of images have not been captured, the process continues (1905) to capture additional images. In embodiments, the threshold number of images is 1-10 images per foot of travel and preferably 3 images per foot of robot travel at a rate of approximately 1 ft per second or approximately 306 mm per second. When the threshold number of images has been captured, the process determines (1925) whether the occlusion detection data identifies one or more portions of the field of view of the camera 125 that are capturing image data that is not being used by the navigation processes. When the occlusion detection data does not identify one or more portions of the field of view that are capturing image data that is not being used by the navigation processes, the mobile robot 10 assumes that the field of view of the camera(s) 125 is unoccluded, and the occlusion detection process completes.

In one implementation, when the occlusion detection data identifies one or more portions of the field of view are capturing image data that is not being used by the navigation processes, the mobile robot 10 provides (1930) a camera occlusion notification to one or more users associated with the mobile robot 10 so that the users can clear the occlusion from the field of view of the camera 125. In one optional aspect of the process, the notification is in the form of an electronic message delivered to a user using user account information located on a server with which the mobile robot 10 can communicate. For example, a user may be notified through email, text message, or other communication. In another optional aspect, the user may be notified through some form of indicator on the mobile robot 10 such as a flashing light, sound, or other appropriate alert mechanism. The mobile robot 10 may also be optionally configured with a wiper blade, fan, air knife, and/or another appropriate cleaning mechanism that mobile robot can use to attempt to eliminate the detected occlusion.

Figure 20:
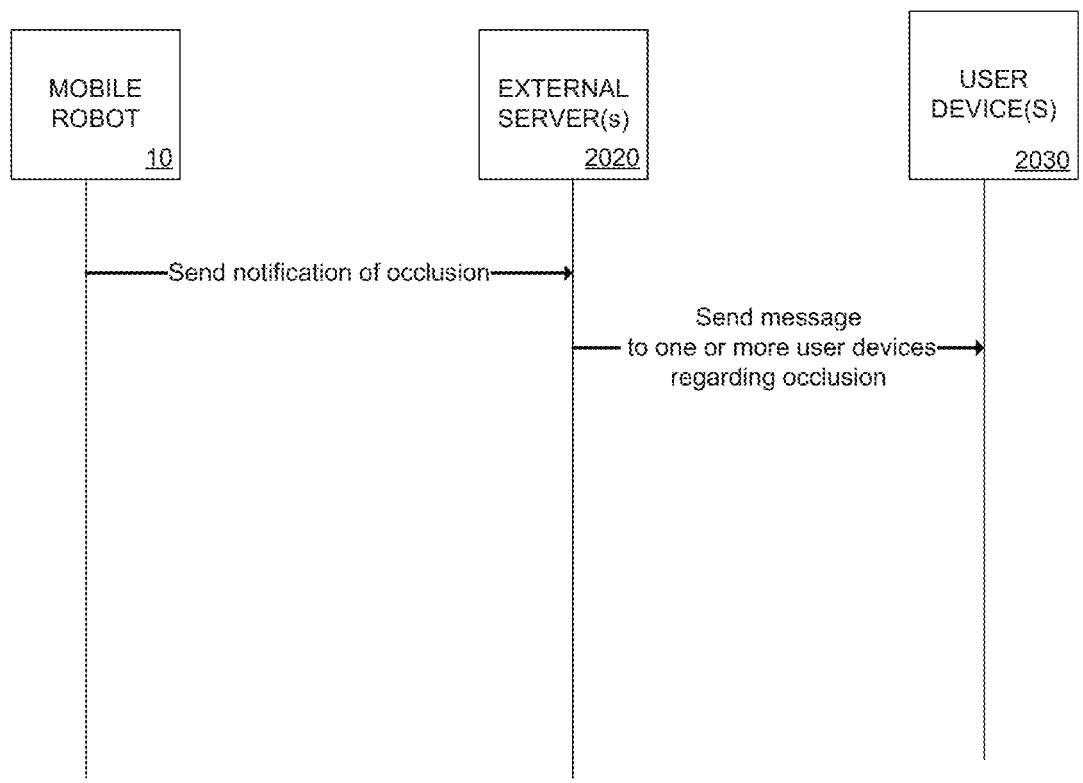
FIG. 20 illustrates a communication diagram illustrating communication between a mobile robot, an external server and a user device.

A communication diagram illustrating communication between the mobile robot 10, an external server and a user device in accordance with an optional aspect of the invention is illustrated in FIG. 20. In particular, FIG. 20 illustrates the mobile robot 10 sending a notification of an occlusion to an external server 2020. The mobile robot 10 may send the notification after it detects the presence of an occlusion that is occluding a portion of the field of view of a camera on the mobile robot 10 such that the unoccluded portions of camera images are no longer useful for localizing the robot 10. In an optional aspect of the invention, the mobile robot 10 may send the notification directly to a user device using a short distance communication protocol such as for example, Bluetooth. Upon receiving a notification from the mobile robot 10, the external server 2020 sends a message to one or more user devices registered to receive notification. In an optional aspect of the invention, the external server may send any one of an SMS text message, an automated voicemail, and/or an electronic mail message. In another optional aspect of the invention, the mobile robot 10 may send the notification on a periodic basis while detecting the continued presence of an occlusion. For example, the mobile robot 10 may send a daily, weekly, or other time based notification reminder while detecting an occlusion. In other optional aspects, the mobile robot 10 may send a notification each time it starts to clean an environment.

Figure 21:
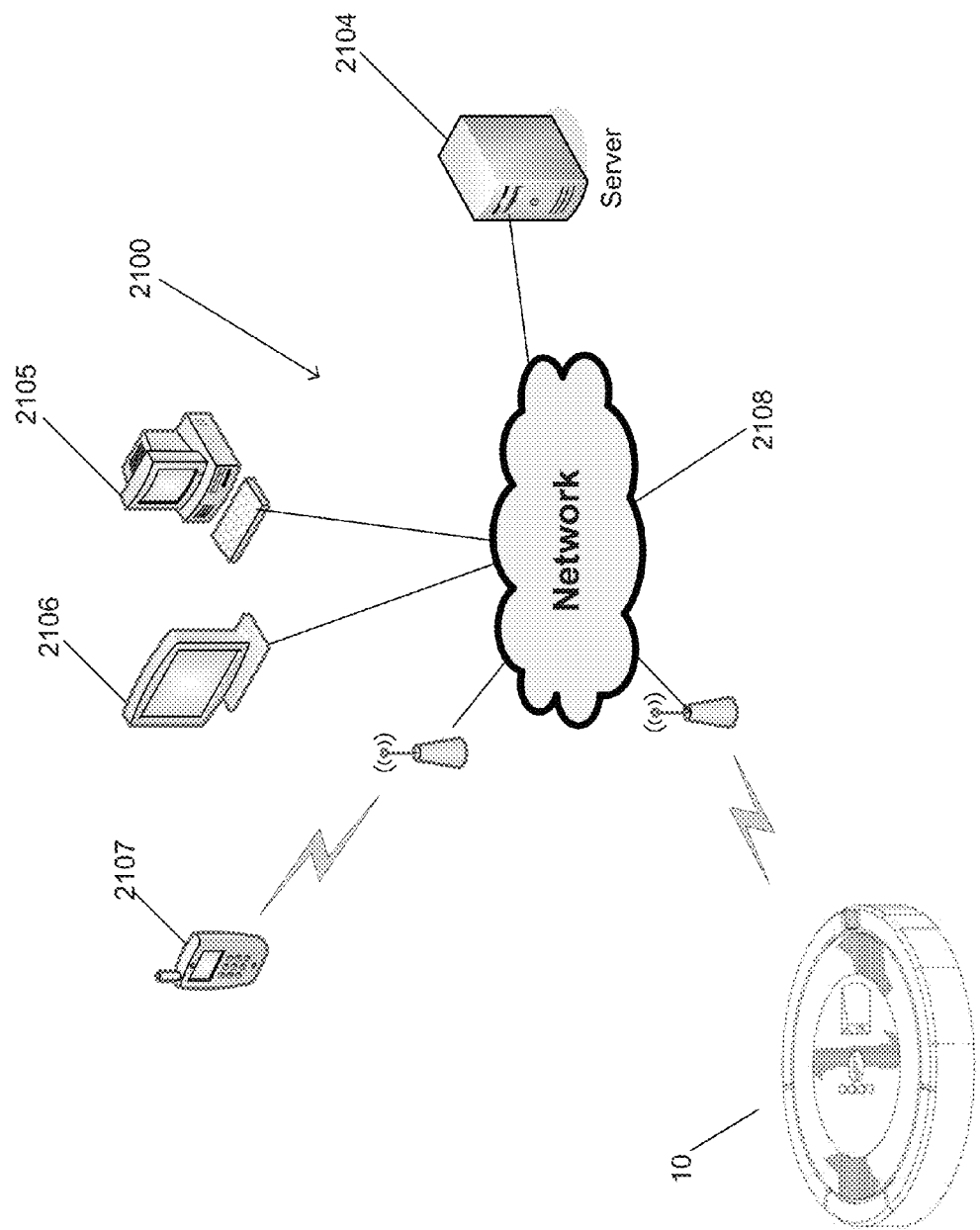
FIG. 21 illustrates a system for notifying user devices of an occlusion.

A system for notifying user devices of an occlusion in accordance with an embodiment of the invention is illustrated in FIG. 21. The system 2100 includes a server 2104 that receives and processes messages from one or more mobile robots. In particular, when the server receives a message from the mobile robot 10, it can provide the message to one or more user devices 2105-2107.

In several embodiments, the variety of user devices can use HTTP, SMS text, or another appropriate protocol to receive message via a network 2108 such as the Internet. In the illustrated embodiment, user devices include personal computers 2105-2106 and mobile phones 2107. In other embodiments, user devices can include consumer electronics devices such as DVD players, Blu-ray players, televisions, set top boxes, video game consoles, tablets, and other devices that are capable of connecting to a server via HTTP and receiving messages.

While the above contains descriptions of many specific optional aspects of the invention, these should not be construed as limitations on the scope of the invention, but rather as an example of different configurations thereof. Accordingly, the scope of the invention should be determined not by the examples illustrated, but by the appended claims and their equivalents.

What is claimed is:

1. A mobile robot configured to navigate an operating environment, comprising:
   a body having a top surface;
   a drive mounted to the body;
   a recessed structure beneath the plane of the top surface near a geometric center of the body;
   a controller circuit in communication with the drive, wherein the controller circuit directs the drive to navigate the mobile robot through an environment using camera-based navigation system; and
   a camera including optics defining a camera field of view and a camera optical axis, wherein:
      the camera is positioned within the recessed structure and is tilted so that the camera optical axis is aligned at an acute angle of 30-40 degrees above a horizontal plane in line with the top surface and is aimed in a forward drive direction of the robot body,
      the field of view of the camera spans a frustum of 45-65 degrees in the vertical direction, and
      the camera is configured to capture images of the operating environment of the mobile robot.

2. The mobile robot of claim 1, wherein the camera is protected by a lens cover aligned at an acute angle with respect to the optical axis of the camera.

3. The mobile robot of claim 2, wherein the lens cover is set back relative to an opening of the recessed structure and an acute angle with respect to the optical axis of the camera that is closer to perpendicular than an angle formed between a plane defined by the top surface and the optical axis of the camera.

4. The mobile robot of claim 2, wherein the acute angle is between 15 and 70 degrees.

5. The mobile robot of claim 3, wherein the angle formed between a plane defined by the opening in the recessed structure and the optical axis of the camera ranges between 10 and 60 degrees.

6. The mobile robot of claim 1, wherein the camera field of view is aimed at static features located in a range of 3 feet to 8 feet from a floor surface at a distance of 3 feet to 10 feet from the static features.

7. The mobile robot of claim 6, wherein the camera images contain about 6-12 pixels per inch and features at the top of the image move upward between successive images more quickly than the speed at which the mobile robot moves and features at the bottom of the image move downward between successive images more slowly than the speed at which the mobile robot moves and wherein the controller is configured to determine the speed of the mobile robot and location of features in the image in identifying disparity between successive images.

8. The mobile robot of claim 7 wherein the mobile robot moves at a velocity of 220 mm per second to 450 mm per second and features lower than 45 degrees relative to the horizon will track slower than approximately 306 mm per second and features higher than 45 degrees will track faster than 306 mm per second.

9. The mobile robot of claim 1, wherein the body further contains:
   a memory in communication with the controller circuit; and
   an odometry sensor system in communication with the drive,
   wherein the memory further contains a visual measurement application, a simultaneous location and mapping (SLAM) application, a landmarks database, and a map of landmarks, wherein the controller circuit directs a processor to:
  actuate the drive and capture odometry data using the odometry sensor system;
  acquire a visual measurement by providing at least the captured odometry information and the captured image to the visual measurement application;
  determine an updated robot pose within an updated map of landmarks by providing at least the odometry information, and the visual measurement as inputs to the SLAM application; and
  determine robot behavior based upon inputs including the updated robot pose within the updated map of landmarks.

10. The mobile robot of claim 9, wherein the landmarks database comprises:
  descriptions of a plurality of landmarks;
  a landmark image of each of the plurality of landmarks and an associated landmark pose from which the landmark image was captured; and
  descriptions of a plurality of features associated with a given landmark from the plurality of landmarks including a 3D position for each of the plurality of features associated with the given landmark.

11. The mobile robot of claim 10, wherein the visual measurement application directs the processor to:
  identify features within an input image;
  identify a landmark from the landmark database in the input image based upon the similarity of the features identified in the input image to matching features associated with a landmark image of the identified landmark in the landmark database; and
  estimate a most likely relative pose by determining a rigid transformation of the 3D structure of the matching features associated with the identified landmark that results in the highest degree of similarity with the identified features in the input image, where the rigid transformation is determined based upon an estimate of relative pose and the acute angle at which the optical axis of the camera is aligned above the direction of motion of the mobile robot.

12. The mobile robot of claim 11, wherein identifying a landmark in the input image comprises comparing unrectified image patches from the input image to landmark images within the landmark database.

13. The mobile robot of claim 11, wherein the SLAM application directs the processor to:
  estimate the location of the mobile robot within the map of landmarks based upon a previous location estimate, odometry data and at least one visual measurement; and
  update the map of landmarks based upon the estimated location of the mobile robot, the odometry data, and the at least one visual measurement.

14. The mobile robot of claim 9, wherein the visual measurement application further directs the processor to generate new landmarks by:
  detecting features within images in a sequence of images;
  identifying a set of features forming a landmark in multiple images from the sequence of images;
  estimating 3D structure of the set of features forming a landmark and relative robot poses at the times each of the multiple images is captured using the identified set of features forming the landmark in each of the multiple images;
  recording a new landmark in the landmark database, where recording the new landmark comprises storing: an image of the new landmark, at least the set of features forming the new landmark, and the 3D structure of the set of features forming the new landmark; and
  notify the SLAM application of the creation of a new landmark.

15. The mobile robot of claim 14, wherein the SLAM application directs a processor to:
  determine a landmark pose as the pose of the mobile robot at the time the image of the new landmark stored in the landmark database is captured; and
  recording the landmark pose for the new landmark in the landmark database.

16. The mobile robot of claim 1, wherein the machine vision sensor system further comprises a plurality of cameras under the top surface of the robot and having focal axes angled upward relative to the horizontal plane of the top surface and wherein at least one camera faces a reverse drive direction opposite to the forward drive direction.

17. The mobile robot of claim 1, wherein the machine vision system comprises a stereo pair of cameras having overlapping fields of view.

18. The mobile robot of claim 1, wherein the camera is positioned within the recessed structure at a distance of at most 6 inches from a floor surface.

19. A mobile robot configured to navigate an operating environment, comprising:
  a body that comprises a top surface located at a height not more than 6 inches from a bottom surface, the body comprising a recessed structure under the top surface, the body containing:
    at least one processor;
      memory containing a behavioral controller application, where the behavioral controller application directs a processor to navigate an environment based on the captured images;
      a machine vision sensor system comprising a camera configured to capture images of the operating environment of the mobile robot, the camera including optics defining a camera field of view and a camera optical axis, where the camera is positioned within the recessed structure and is tilted so that the optical axis is aligned at an acute angle between 10 and 60 degrees above a forward drive direction of motion of the mobile robot.

20. The mobile robot of claim 19, the body further containing:
  a lens cover protecting the camera, wherein the lens cover is set back relative to an opening of the recessed structure at an acute angle with respect to the optical axis of the camera that is closer to perpendicular than an angle formed between a plane defined by the opening in the recessed structure and the optical axis of the camera.

* * * * *